(12) United States Patent
Hiraguchi

(10) Patent No.: US 6,719,231 B2
(45) Date of Patent: Apr. 13, 2004

(54) TAPE DRIVE DEVICE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/321,547

(22) Filed: Dec. 18, 2002

(65) Prior Publication Data

US 2003/0122013 A1 Jul. 3, 2003

(30) Foreign Application Priority Data

Dec. 28, 2001 (JP) ........................................ 2001-400349

(51) Int. Cl.[7] ................................................ G11B 15/66
(52) U.S. Cl. .............................. 242/332.8; 242/332.4; 242/332.7; 360/95
(58) Field of Search ........................... 242/332.4, 332.7, 242/332.8, 532.1, 532.6, 532.7, 582; 360/132, 95

(56) References Cited

U.S. PATENT DOCUMENTS

| | | | | |
|---|---|---|---|---|
| 3,383,068 A | * | 5/1968 | Winkler et al. ........... | 242/332.8 |
| 3,752,416 A | * | 8/1973 | Fukatsu et al. ........... | 242/332.8 |
| 4,426,047 A | | 1/1984 | Richard et al. | |
| 4,477,851 A | * | 10/1984 | Dalziel et al. ............. | 242/332.4 |
| 4,793,569 A | * | 12/1988 | Ohsaki ...................... | 242/332.4 |
| 4,828,201 A | * | 5/1989 | Smith ........................ | 242/332.4 |
| 5,443,220 A | * | 8/1995 | Hoge et al. ............... | 242/332.8 |
| 6,241,171 B1 | * | 6/2001 | Gaboury .................... | 242/332.8 |
| 6,540,167 B2 | * | 4/2003 | Sasaki et al. .............. | 242/332.4 |
| 6,565,028 B2 | * | 5/2003 | Sasaki et al. .............. | 242/332.4 |

\* cited by examiner

*Primary Examiner*—William A. Rivera
(74) *Attorney, Agent, or Firm*—Sughrue Mion, PLLC

(57) ABSTRACT

In a tape drive device of the present invention, a window portion, through which a leader pin attached to a distal end of a magnetic tape can pass, is provided in a reel hub for winding the magnetic tape. The leader pin is fed into the reel hub through the window portion and is accommodated and held at an accommodation recess portion of a clamp member. The clamp member holds the leader pin and is rotated a half-turn inside the reel hub. Then, a closing portion is advanced into the window portion. A distal end surface of this closing portion is formed in a circular arc shape in accordance with an outer peripheral surface of the reel hub. Together with the outer peripheral surface of the reel hub, the distal end surface structures a winding surface around which the magnetic tape is wound.

24 Claims, 12 Drawing Sheets

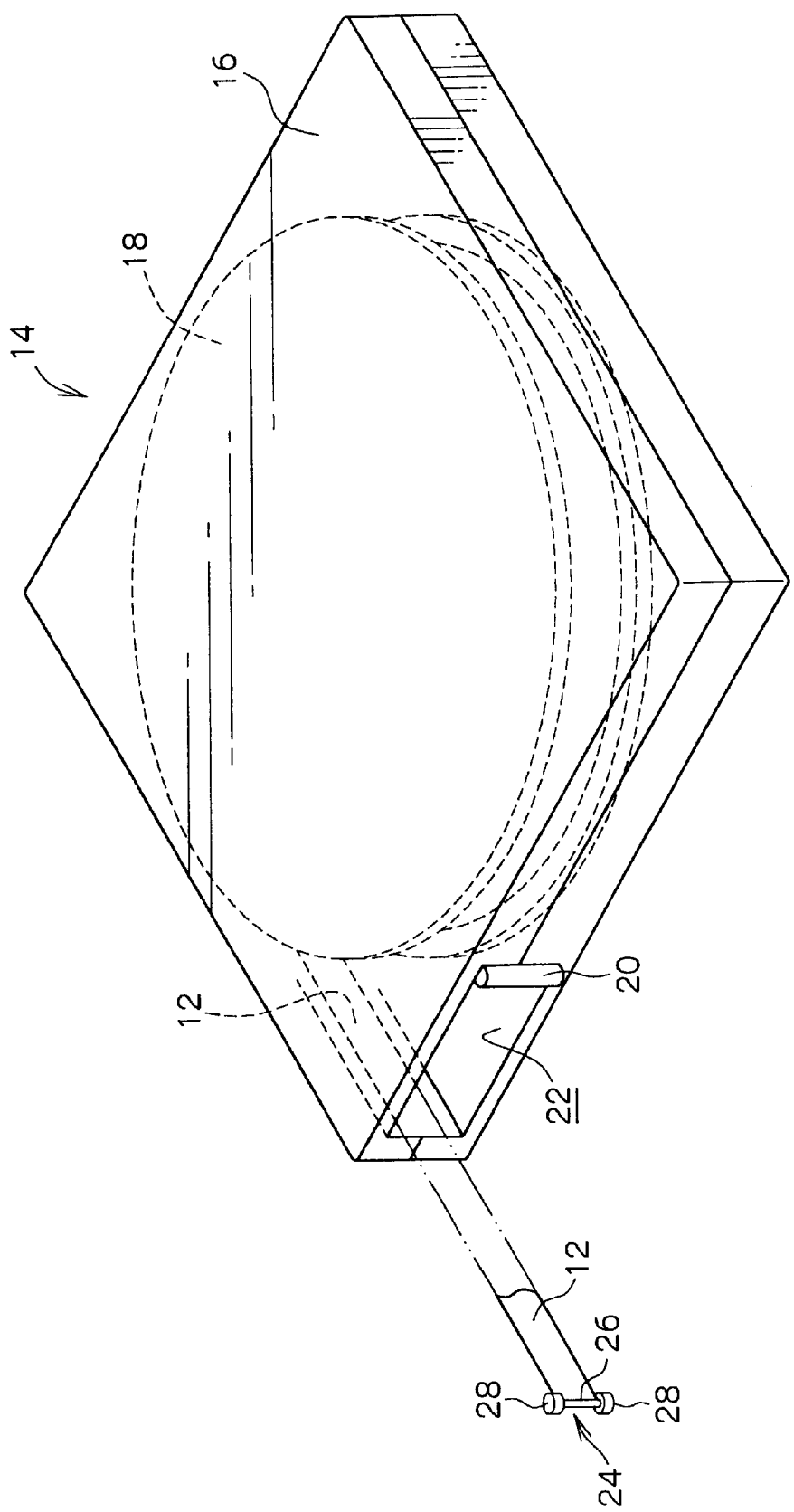

TAPE DRIVE DEVICE

BACKGROUND OF THE INVENTION

1. Field of the Invention

The present invention relates to a tape drive device which records information on a recording tape and/or replays information recorded on the recording tape while winding the recording tape, which is provided with a leader member at a distal end portion thereof, on a winding reel.

2. Description of the Related Art

Recording tapes such as magnetic tapes and the like are used as external recording media for computers and the like. For storing recording tapes, which take up little accommodation space when stored and can record large amounts of information, recording tape cartridges that accommodate in a case a single reel on which a recording tape is wound are employed.

When such a recording tape cartridge is used, that is, when information is to be recorded onto the recording tape and/or information recorded on the recording tape is to be replayed, the recording tape cartridge is loaded at a tape drive device. In the tape drive device at which the recording tape cartridge is loaded, a leader member attached at a distal end of the recording tape is drawn out of the case by drawing-out means.

The leader member is guided to a winding reel of the tape drive device by the drawing-out means, and the recording tape is wound up on this winding reel while being sequentially drawn out from the case. Hence, recording/replaying of information is carried out by a recording head or the like which is provided along a predetermined tape path.

When the recording tape is being wound up on the winding reel of the tape drive device, the leader member attached at the distal end of the recording tape is accommodated inside a reel hub which forms a winding surface of the winding reel.

Specifically, in a structure in which a block-like leader block is used as the leader member, the leader block is inserted into an insetting portion which is formed as a slit provided along a radial direction of the reel hub. In this state, an end surface of the leader block structures a portion of the winding surface of the reel hub. This end surface of the leader block is curvedly formed in an arc shape corresponding to the outer surface of the reel hub, so that the recording tape can be wound smoothly.

However, in a tape drive device provided with this conventional leader member-accommodating structure, the leader block structuring the portion of the winding surface is a structural member of the recording tape cartridge. In other words, this portion of the winding surface is structured by a different leader block for each recording tape cartridge that is loaded. As a result, individual differences in dimensional accuracy of the leader blocks cannot be absorbed at the tape drive device side, and a step that cannot be tolerated may be formed at the winding surface of the reel hub.

Such a step may cause creasing or deformation of the recording tape, and such creasing or deformation may be generated at a corresponding portion of the recording tape wound in succeeding layers, which is substantially a recording region (i.e., a "tape impression" may occur). A portion of the recording tape at which such a tape impression (crease) has occurred will not maintain a proper separation from the recording head when undergoing recording/replaying of information. Therefore, occurrence of a region at which information cannot be recorded and/or a loss of recorded information may be caused.

In particular, when an opening width of the insetting portion of the reel hub which accommodates the block-like leader block is large (for example, if a width of the recording tape is 12.7 mm, an opening width at an outer peripheral portion of around 12 mm for a reel hub with a diameter of 50 mm), the effect of individual differences between leader block dimensions will be large, and the possibility that the problem described above will occur is high.

Accordingly, a structure in which a small cylindrical leader pin is used as a leader member of a recording tape cartridge has been employed. In this structure, a leader block is accommodated in a reel hub, together with the leader pin hooked at the leader block on the tape drive device side. This leader block is structured such that the leader block is moved by, for example, a cam mechanism, arm mechanism or the like provided with a pin which engages with a through-hole of the leader block, from a position at which the leader block hooks onto the leader pin, which is accommodated in a case (the recording tape cartridge), to a position at which the leader block is accommodated at the reel hub.

In this structure, the leader block of the tape drive device structures a portion of a winding surface when the leader block is accommodated in an insetting portion of the reel hub. That is, the leader block and the reel hub are both members of the tape drive device and have a one-to-one correspondence. Therefore, individual differences in dimensional accuracy between recording leader pins, as the components of the recording tape cartridge, have no effect with regard to steps in the winding surface.

However, in the case of the aforementioned leader block which structures drawing-out means and rotates integrally with the reel hub, when the leader pin and leader block are accommodated at the reel hub, the engagement of the pin of the cam mechanism or the like with the through-hole has to be released such that the cam mechanism or the like does not interfere with rotation of the reel hub. Consequently, the leader block becomes movable in the reel hub. As a result, in this structure, the positioning of the leader block is not carried out by the leader block's abutting against at the reel hub. Moreover, the leader block has to be moved along a complex path corresponding to the predetermined tape path by a plurality of cam mechanisms, arm mechanisms and the like. Thus, displacement errors of the cam mechanisms, arm mechanisms and the like are aggregated. As a result, the leader block may be not accurately positioned in the reel hub.

Specifically, in this structure, due to the problem of accuracy in positioning the (tape drive device side) leader block relative to the reel hub, a step which causes a tape impression may occur at the winding surface, that is, between an opening periphery portion of the insetting portion of the reel hub and an end surface of the leader block.

SUMMARY OF THE INVENTION

An object of the present invention, in consideration of the circumstances described above, is to provide a tape drive device which can make steps that occur at a winding surface of a reel hub of a winding reel significantly smaller.

In order to achieve the above-described object, in the present invention, a tape drive device that winds a recording tape, which is provided with a leader member at a distal end portion thereof, at a winding reel while carrying out at least one of recording of information to the recording tape and replaying of information that has been recorded to the recording tape includes: a hollow reel hub which structures the winding reel and includes an outer peripheral surface which constitutes a winding surface for the recording tape; a window portion formed penetrating through a peripheral wall of the reel hub, the leader member being passable through the window portion; and a closing member disposed in the reel hub, the closing member being advanceable and withdrawable with respect to the window portion and, when the leader member has been fed into the reel hub, the closing member advancing to the window portion and structuring a portion of the winding surface.

In the tape drive device according to the present invention, when the leader member attached at the distal end of the recording tape passes through the window portion of the reel hub and is fed into the reel hub, the closing member advances from the inside of the reel hub to the window portion, and the closing member closes the window portion and structures the portion of the winding surface of the reel hub.

In this state, when the reel hub (the winding reel) rotates, a portion of the recording tape that passes out between the window portion and the closing member and is positioned at an outer side of the reel hub is wound at the winding surface, which is structured by the outer peripheral surface of the reel hub and the closing member, while recording of information and/or replaying of information recorded on the recording tape is carried out.

The closing member provided inside the reel hub advances to the window portion and structures the portion of the winding surface. In other words, the closing member structuring the portion of the winding surface is a structural component of the tape drive device. Therefore, steps will not be caused at the winding surface due to individual differences between leader members.

Moreover, the closing member provided in the reel hub can be advanced to the window portion (to structure the winding surface) by a simple operation (for example, just by a linear movement or a rotation or the like). Therefore, an operational error is small, and the closing member can be positioned in the reel hub with high accuracy for structuring the winding surface.

Accordingly, in the above-mentioned drive device based, positional accuracy of a closing member can be improved because dimensional accuracy of the closing member is controllable (i.e., is free of individual differences) with respect to a reel hub. Therefore, a step that occurs at a winding surface structured by the reel hub and the closing member can be diminished. That is, steps that are formed at the winding surface of the reel hub of the winding reel can be made smaller.

Further, regarding the dimension of the window portion of the reel hub, it suffices that the leader member can pass through the window portion of the reel hub. Therefore, if, for example, the structure corresponds to a small leader member such as a leader pin, influences of dimensional errors of the closing member can be reduced, which is even more favorable.

Further again, in a tape drive device having the structure described above, if the closing member, in a state of having advanced to the window portion, is positioned by directly abutting against the reel hub (for example, against an inner peripheral surface thereof, an engaging portion provided standing at the interior thereof, or the like), the positioning accuracy of the closing member is further improved, and a step in the winding surface is even further diminished.

In a second aspect of the present invention, another tape drive device that winds a recording tape, to a distal end portion of which a leader member is attached, at a winding reel while carrying out at least one of recording of information to the tape and replaying of information that has been recorded to the recording tape may include: a hollow reel hub which structures the winding reel and includes an outer peripheral surface which constitutes a winding surface for the recording tape; a window portion penetrating through a peripheral wall of the reel hub, and through which the leader member can pass; and an accommodation portion disposed in the reel hub and having a recess portion into which the leader member can be inserted, wherein, when recording and/or replaying is to be carried out, the leader member passes through the window portion and is fed into the recess portion, and the accommodation member moves in the reel hub and accommodates the leader member in the reel hub such that the leader member cannot come out.

In a tape drive device of this structure, the leader member attached at the distal end of the recording tape passes through the window portion of the reel hub and is fed into the recess portion of the accommodation member. Then, the accommodation member moves and the leader member is non-removably accommodated at the inside of the reel hub. That is, the accommodation member displaces, turns, rotates or the like from a state in which the recess portion opens (communicates) at the window portion, so as to accommodate the leader member positioned in the recess portion inside the reel hub such that the leader member cannot fall out. In this state, when the reel hub (the winding reel) rotates, a portion of the recording tape that passes out through the window portion and is positioned at an outer side of the reel hub is wound at the outer peripheral surface of the reel hub while the recording of information onto the recording tape and/or replaying of information recorded on the recording tape is carried out. According to this structure, it suffices if drawing-out means of the tape drive device guides the leader member as far as a feeding-in position of the recess portion. Thus, there is no need for the drawing-out means to be accommodated at the reel hub with the leader member (and to rotate integrally with the reel hub). Therefore, the drawing-out means (for example, a cam mechanism, an arm mechanism or the like) does not interfere with rotation of the reel hub, and thus particular counter-measures against such interference are not necessary. As a result, structure of the drawing-out means, that is, structure of the tape drive device, can be simplified.

Thus, if the above-described accommodation portion is employed in a tape drive device of the present invention, the structure of the drawing-out means is simplified and a step in the winding surface can be reduced to no more than a predetermined amount, which is favorable.

In the structure of the first aspect, in order to resist a pulling force, the recording tape may be, for example, nipped between the window portion and the closing member. However, in a structure in which the accommodating member is provided along with the closing member, there is no need for the recording tape to be nipped (held) between the window portion and the closing member. Thus, a degree of freedom of design is enhanced. Moreover, if the structure is a structure in which the closing member is provided at the accommodation member, or the accommodation member also functions as the closing member (i.e., the accommodation member and the closing member are integrated), a number of components can be reduced and structure can be simplified, which is even more favorable.

BRIEF DESCRIPTION OF THE DRAWINGS

FIG. 3A is a perspective view showing a leader pin-holding structure. FIG. 3B is a perspective view showing a modified example of the leader pin-holding structure.

FIG. 5A shows an insertion-receiving state. FIG. 5B shows a leader pin-holding state. FIG. 5C shows a counter-rotated state. FIG. 5D shows a state in which a window portion of the reel hub is closed. FIG. 5E shows a state in which winding of a magnetic tape is commenced.

FIG. 6A shows an insertion-receiving state. FIG. 6B shows a state preparatory to counter-rotation. FIG. 6C shows a counter-rotated state. FIG. 6D shows a state preparatory to advancement to a window portion. FIG. 6E shows a state of advancement to the window portion. FIG. 6F shows a state enabling winding of the magnetic tape. FIG. 6G shows a state preparatory to withdrawal from the window portion. FIG. 6H shows a state of withdrawal from the window portion. FIG. 6I shows a state of returning to an initial position. FIG. 6J shows a state in which a leader pin has been detached.

FIG. 7 is a perspective view showing schematic structure of a recording tape cartridge to be loaded at tape drive devices relating to various embodiments of the present invention.

FIG. 9A is a diagram showing an insertion-receiving state. FIG. 9B is a diagram showing a state preparatory to counter-rotation. FIG. 9C is a diagram showing a counter-rotated state. FIG. 9D is a diagram showing a state preparatory to advancement to a window portion. FIG. 9E shows a state of advancement to the window portion. FIG. 9F shows a state enabling winding of the magnetic tape. FIG. 9G shows a state preparatory to withdrawal from the window portion. FIG. 9H shows a state of withdrawal from the window portion. FIG. 9I shows a state of returning to an initial position.

FIG. 11A is a plan view showing a leader pin insertion-receiving state. FIG. 11B is a plan view showing a state of closing a window portion of a reel hub.

FIG. 12A shows a leader pin drawing-out state. FIG. 12B shows a leader pin-accommodating state. FIG. 12C shows a state of closing a window portion of a reel hub.

DESCRIPTION OF THE PREFERRED EMBODIMENTS

Figure 1:
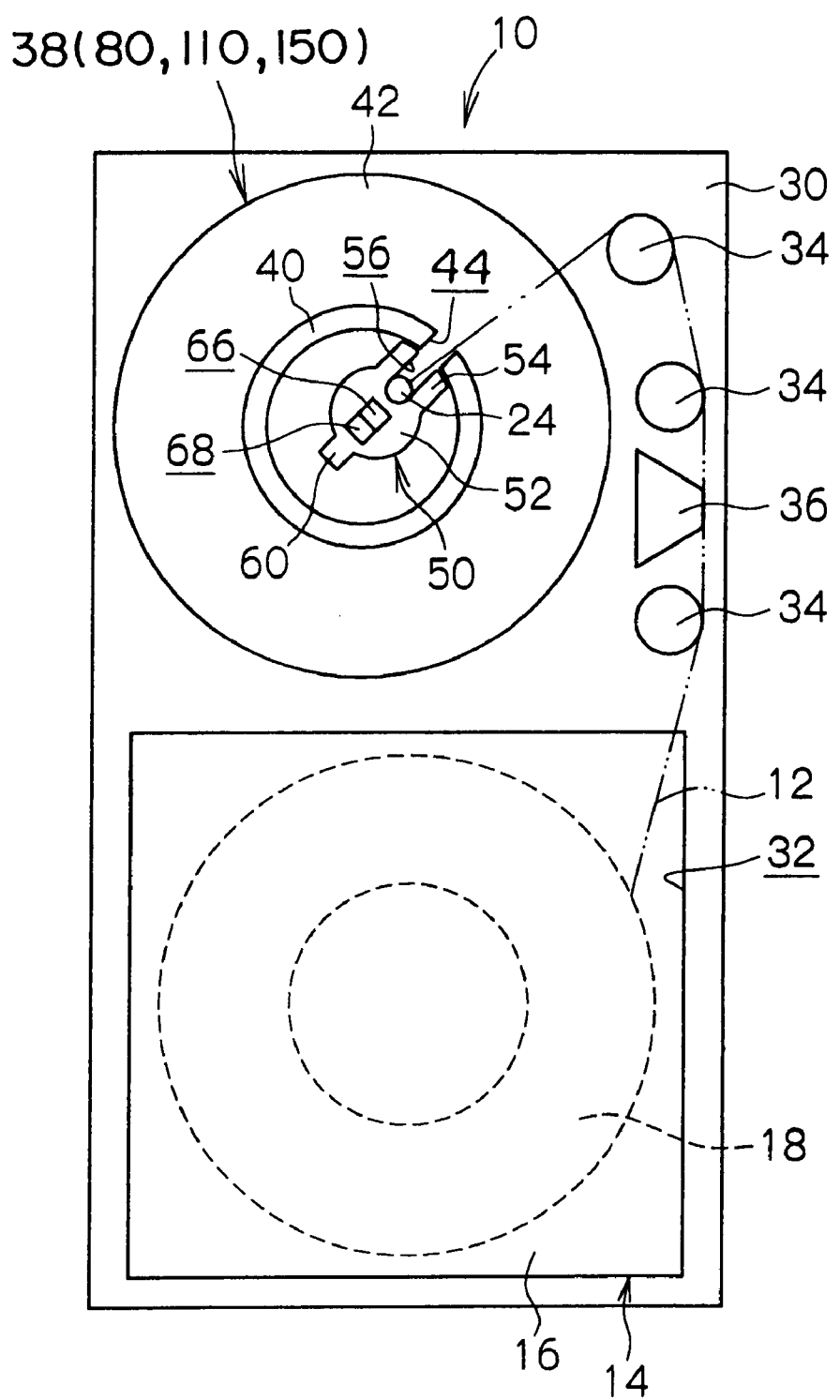
FIG. 1 is a plan view showing schematic overall structure of a tape drive device relating to a first embodiment of the present invention.

A tape drive device 10 relating to an embodiment of the present invention will be explained. Firstly, general structure of a recording tape cartridge 14, which is provided with a magnetic tape 12, for loading at the tape drive device 10 and recording/replaying information, and general structure of the tape drive device 10 will be described. Thereafter, winding reels 38, 80, 110, and 150 relating to first to third embodiments, which respectively structure the tape drive device 10 and are principal components of the present invention, will be described.

General Structure of Recording Tape Cartridge

FIG. 7 shows schematic overall structure of the recording tape cartridge 14 in a perspective view. As shown in this drawing, the recording tape cartridge 14 has a structure in which a single reel 18 is accommodated in a case 16. The case 16 has a substantially rectangular shape in plan view. The magnetic tape 12, which serves as a recording tape which is an information recording and replaying medium, is wound around the single reel 18.

A gear aperture (which is not illustrated) for exposing a reel gear of the reel 18 is provided in a lower surface of the case 16. The reel 18 is driven to rotate inside the case 16 by the reel gear meshing with a driving gear of the tape drive device 10. An opening aperture 22, which is opened and closed by a slide door 20, is formed in the case 16. The opening aperture 22 is for drawing out the magnetic tape 12.

A leader pin 24 is attached at a distal end of the magnetic tape 12, to serve as a leader member. The leader pin 24 is constituted by a narrow shaft portion 26 connected to the magnetic tape 12, and engaging portions 28 provided at both of end portions of the narrow shaft portion 26. The narrow shaft portion 26 has a small cylinder shape, and the engaging portions 28 have short cylinder shapes with larger diameters than the narrow shaft portion 26. The engaging portions 28 are for drawing-out operations by drawing-out means of the tape drive device 10 (not shown), and are for being held by a clamp member 50 or the like described later, so that the leader pin is held at an accommodation recess portion 56 or the like.

General Structure of Tape Drive Device

FIG. 1 shows schematic structure of the tape drive device 10 in a state in which the recording tape cartridge 14 is loaded therein, in plan view. As shown in this drawing, the structure of the tape drive device 10 is provided with a main body 30, a cartridge accommodation section 32, a plurality of rollers 34 and a recording/replaying head 36, and is further provided with any one of the winding reels 38, 80, 110 and 150, which are described in detail later. The cartridge accommodation section 32 is provided at the main body 30. The rollers 34 are rotatably supported at the main body 30 and regulate a predetermined tape path. The recording/replaying head 36 is disposed along the tape path. FIG. 1 shows an overall structure in which, as an example, the winding reel 38 is provided.

The recording tape cartridge 14 can be loaded at and removed from the cartridge accommodation section 32. The unillustrated driving gear is disposed under the cartridge accommodation section 32. The driving gear meshes with the reel gear of the reel 18 of the recording tape cartridge 14, and can drive to rotate the reel 18.

The magnetic tape 12 is connected to the leader pin 24, which is drawn out from the opening aperture 22 of the recording tape cartridge 14 and guided to the winding reel 38 by the unillustrated drawing-out means. The drawing-out means winds the magnetic tape 12 about each of the rollers 34, and thus the rollers 34 form the predetermined tape path from the reel 18 of the recording tape cartridge 14, which is in the loaded state, to the winding reel 38.

The winding reel 38, 80, 110 or 150 is rotatably supported at the main body 30 and is driven to rotate synchronous with the aforementioned driving gear (and the reel 18) by an unillustrated driving motor. In this structure, the magnetic tape 12 is wound around the winding reel 38 or the like by the rotation thereof while the magnetic tape 12 is continually drawn out from the case 16.

Structure of Winding Reel Relating to First Embodiment

Figure 2:
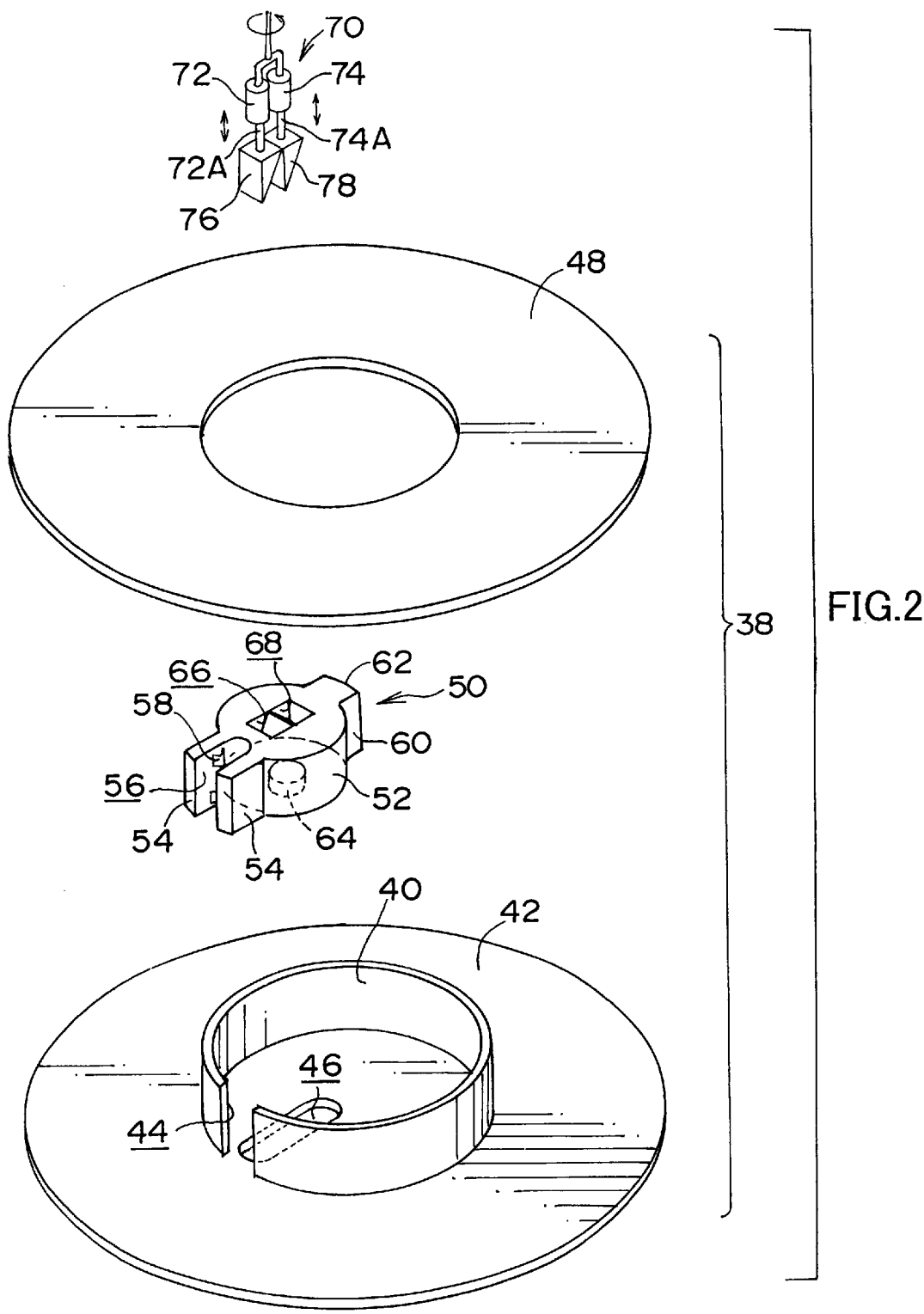
FIG. 2 is a an exploded perspective view showing a winding reel of the tape drive device relating to the first embodiment of the present invention.

Next, the winding reel 38 relating to a first embodiment of the tape drive device 10 will be described on the basis of FIGS. 2 to 6J. As shown in FIG. 2, in an exploded perspective view, the winding reel 38 is provided with a reel hub 40.

The reel hub 40 is formed in a tubular shape, and is formed coaxially and integrally with a disc-like lower flange 42, which is at a lower end portion of the reel hub 40. A height of the reel hub 40 is slightly greater than a length of the leader pin 24. The reel hub 40 is provided with a window portion 44 which is formed by cutting away (penetrating through) a peripheral wall of the reel hub 40 along the whole height thereof, such that the leader pin 24 can pass therethrough in a radial direction. Here, a width of the window portion 44 is slightly greater than the diameters of the engaging portions 28 of the leader pin 24.

A long hole 46 is provided in the lower flange 42 (a bottom face of the reel hub 40) at an inner side of the reel hub 40. The long hole 46 has length along a radial direction of the reel hub 40 which length is in line with a width direction central portion of the window portion 44. The long hole 46 is for guiding the later-described clamp member 50 (i.e., for regulating directions of operation).

The winding reel 38 is also provided with an upper flange 48. The upper flange 48 is formed in an annular shape having an inner diameter the same as an inner diameter of the reel hub 40 and an outer diameter the same as an outer diameter of the lower flange 42. The upper flange 48 is coaxially fixed at an upper end portion of the reel hub 40 by ultrasonic welding or the like. Thus, an interior portion of the reel hub 40 is structured to be accessible from above.

The clamp member 50, which also functions as a closing member and an accommodation member, is disposed at the interior of the reel hub 40. The clamp member 50 is provided with a substantially cylindrical trunk portion 52 whose height (length in an axial direction) is the same as the height of the reel hub 40.

A pair of holding pieces 54 protrudes from outer peripheral portions of the trunk portion 52 along the whole height thereof, and the accommodation recess portion 56 is formed between the holding pieces 54. The accommodation recess portion 56 is substantially U-shaped in plan view and extends in along the radial direction of the trunk portion 52 as far as the trunk portion 52. A width of the accommodation recess portion 56 (a spacing between the holding pieces 54) is the same as the width of the window portion 44. The inner end of the accommodation recess portion 56 is formed in a circular arc shape whose diameter is slightly greater than the engaging portions 28. Thus, the leader pin 24 is insertable inside the accommodation recess portion 56. Distal ends of the pair of holding pieces 54 are curved to correspond with the inner surface of the reel hub 40.

Figure 3A:
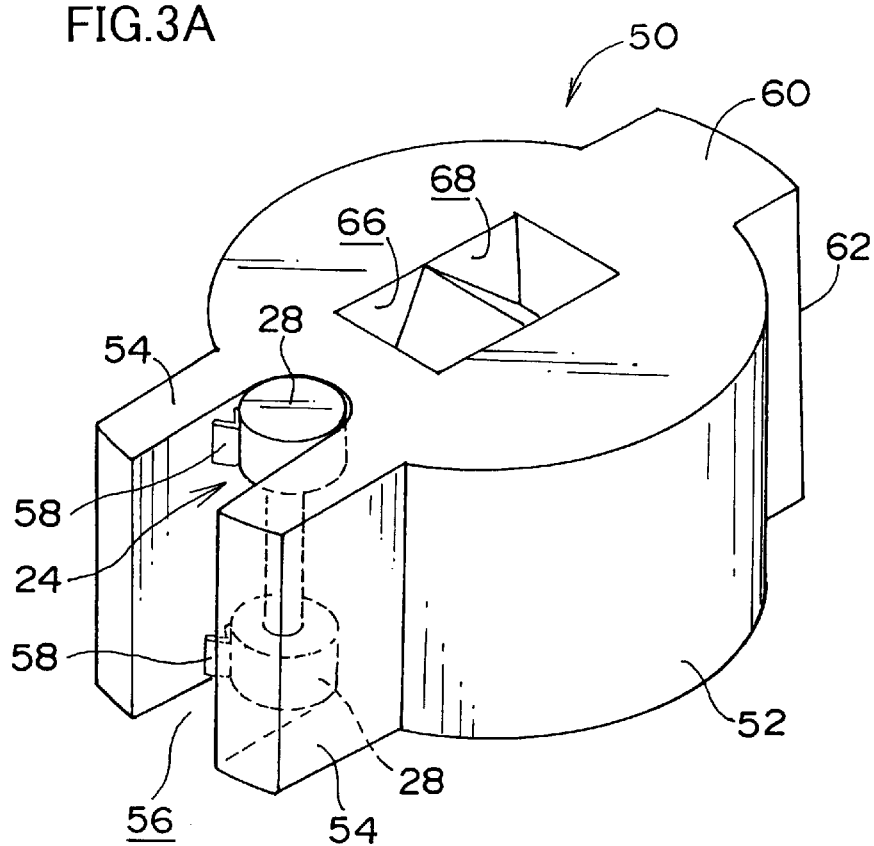
FIGS. 3A and 3B are views showing a clamp member of the tape drive device relating to the first embodiment of the present invention.
Figure 3B:
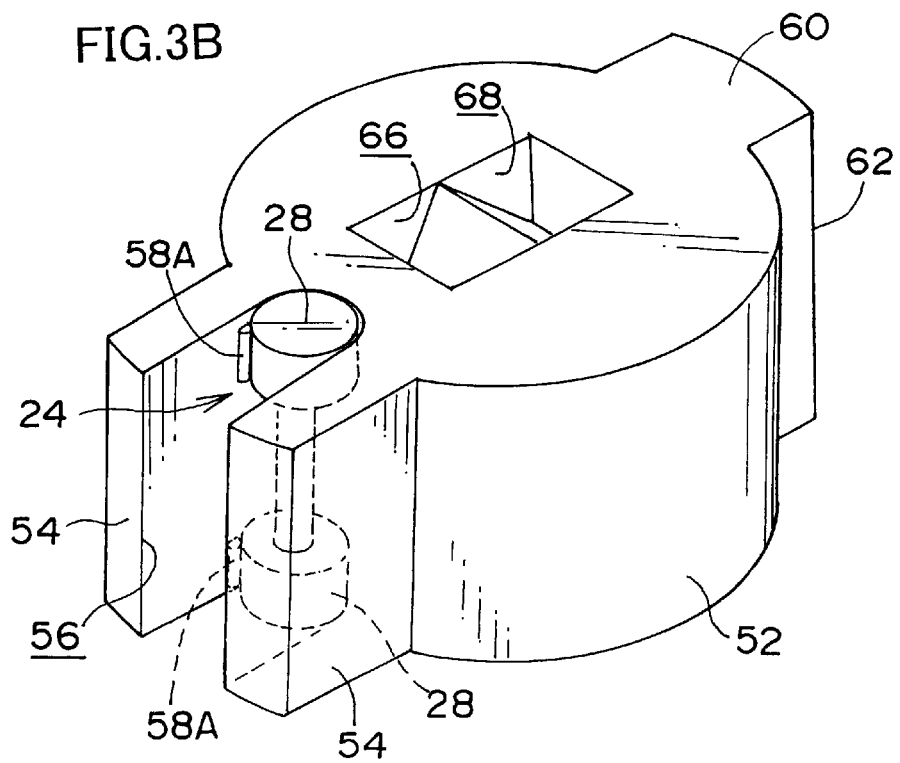

As shown in FIG. 3A, presser springs 58 are provided at an inner surface of the accommodation recess portion 56. The presser springs 58 are engaged by the engaging portions 28 of the leader pin 24 that has been pushed into the accommodation recess portion 56, and prevent the leader pin 24 from dropping out (i.e., resist pulling force of the magnetic tape 12). In a case in which the pair of holding pieces 54 are structured to be resiliently deformable in a thickness direction thereof, protrusions 58A may be provided instead of the presser springs 58, as shown in FIG. 3B.

A closing portion 60 protrudes from an outer peripheral portion of the trunk portion 52 at a side thereof opposite to the side thereof at which the accommodation recess portion 56 is provided, along the whole height thereof. A width of the closing portion 60 is such that the closing portion 60 can be inserted (advanced) into the window portion 44 while nipping a single layer of the magnetic tape 12. A length of the closing portion 60 (a protrusion amount thereof from the trunk portion 52) is the same as a thickness of the reel hub 40. A distal end surface 62 of the closing portion 60 is formed in a circular arc shape corresponding to an outer peripheral surface of the reel hub 40.

Accordingly, when the closing portion 60 is advanced into the window portion 44, the closing portion 60 occludes the window portion 44 (while nipping the magnetic tape 12) and, together with the outer peripheral surface of the reel hub 40, the distal end surface 62 of the closing portion 60 structures a winding surface onto which the magnetic tape 12 is wound.

Figure 4:
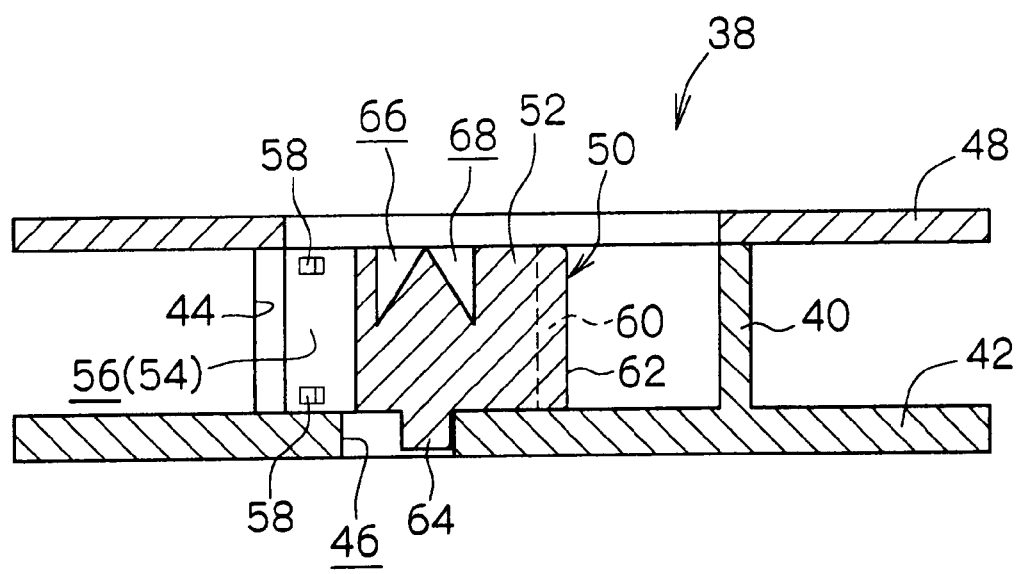
FIG. 4 is a side sectional view showing the winding reel of the tape drive device relating to the first embodiment of the present invention.

As shown in FIG. 4, a short cylindrical support shaft 64 protrudes from an axial center portion of a lower end face of the trunk portion 52. A diameter of the support shaft 64 corresponds to a width of the long hole 46. Thus, the clamp member 50 is structured to be restricted, by the support shaft 64 being inserted into the long hole 46, to be capable only of rotation around the support shaft 64 and translation along the length direction of the long hole 46. A maximum length from an axial center of the support shaft 64 to the distal ends of the holding pieces 54 is set to be slightly greater than a maximum length from the axial center of the support shaft 64 to the distal end surface 62 of the closing portion 60.

A pair of taper holes 66 and 68 with rectangular openings are provided in the trunk portion 52 at an upper end thereof. The taper holes 66 and 68 are symmetrically adjacent to the axial center (the center of rotation of the support shaft 64) along a radial direction of the trunk portion 52 that runs between a central portion of the accommodation recess portion 56 and a central portion of the closing portion 60. The taper hole 66 is at the accommodation recess portion 56 side, and a surface thereof at the closing portion 60 side is inclined such that the taper hole 66 has a tapered form which widens toward an opening side thereof (the upper side). The taper hole 68 is at the closing portion 60 side, and a surface thereof at the accommodation recess portion 56 side is inclined such that the taper hole 68 has a tapered form which widens toward an opening side thereof (the upper side).

Figure 5A:
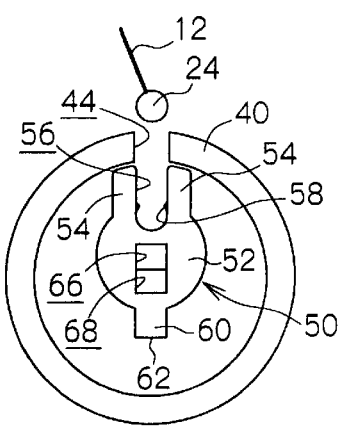
FIGS. 5A to 5E are plan views showing a process for operation of the clamp member in the winding reel of the tape drive device relating to the first embodiment of the present invention.
Figure 5B:
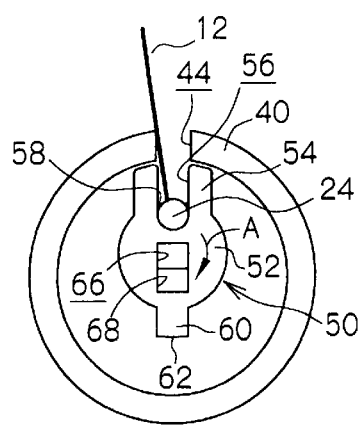

The clamp member 50 described above is operated as shown in FIGS. 5A to 5E. Specifically, in an initial state, the clamp member 50 is set to an insertion-receiving state in which the accommodation recess portion 56 communicates with the window portion 44 of the reel hub 40, as shown in FIG. 5A. As shown in FIG. 5B, the leader pin 24 is accommodated and held in the accommodation recess portion 56, and the clamp member 50 rotates a half-turn in the direction of arrow A around the center of rotation of the support shaft 64, to attain the state shown in FIG. 5C. From this state, the support shaft 64 is guided in the long hole 46 and moves (translates) outward in the radial direction of the reel hub 40. Thus, the closing portion 60 is inserted at the window portion 44 as shown in FIG. 5D.

Figure 5C:
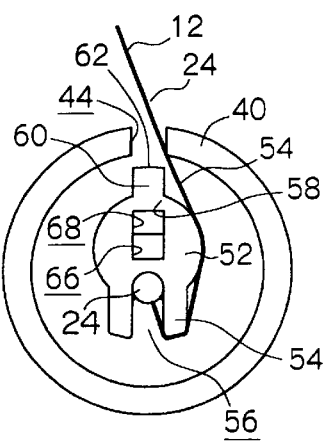
Figure 5D:
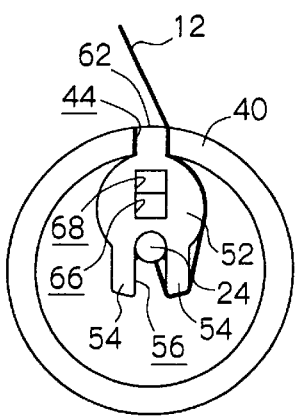

In the state shown in FIG. 5D, the trunk portion 52 is positioned abutting against the inner surface of the reel hub 40, and the distal end surface 62 of the closing portion 60 is substantially flush with the outer peripheral surface of the reel hub 40, thus structuring the winding surface. The support shaft 64 may, for example, engage with an end portion of the long hole 46 for this positioning.

The tape drive device 10 that is equipped with the winding reel 38 is equipped with a clamp-driving mechanism 70 for translating (linearly moving) and rotating the clamp member 50 as described above. The clamp-driving mechanism 70 is rotatably driveable as a whole around the center of rotation of the clamp member 50 (the axial center of the support shaft 64 when the closing portion 60 is at a withdrawn position from the window portion 44). The clamp-driving mechanism 70 is provided with a pair of air cylinders 72 and 74, which are symmetrical about this rotation axis.

The air cylinders 72 and 74 are equipped with rods 72A and 74A, respectively, which are extendable and retractable along the axial direction. Wedge-shaped engaging blocks 76 and 78 are provided at distal ends of the rods 72A and 74A. The engaging blocks 76 and 78 are formed to correspond to the taper holes 66 and 68, respectively, and are fittable thereinto. The engaging blocks 76 and 78 are disposed such that inclined surfaces thereof, which are respectively at the same sides along a direction of arrangement of the engaging blocks 76 and 78 (the direction of a line passing through the center of rotation), are substantially parallel. In the initial state, the engaging block 76 is in a state in which the engaging block 76 can be fitted into the taper hole 66 (see FIG. 6A).

Driving of the clamp member 50 by this clamp-driving mechanism 70 is explained in the following description of operation of the present embodiment.

Next, operation of this first embodiment will be described.

In the tape drive device 10 provided with the winding reel 38 having the structure described above, when the recording tape cartridge 14 is loaded and accommodated at the cartridge accommodation section 32 of the main body 30, or concurrently with the loading operation, the slide door 20 of the recording tape cartridge 14 is moved and the opening aperture 22 is opened.

Figure 6A:
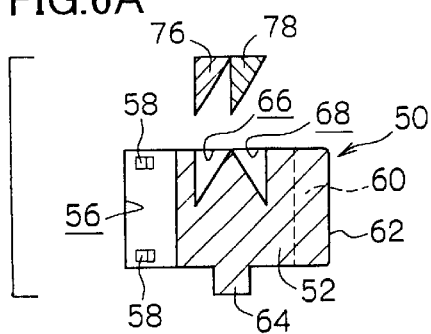
FIGS. 6A to 6J are side sectional views showing a process of driving of the clamp member of the tape drive device relating to the first embodiment of the present invention, by a clamp-driving mechanism.

Hence, the drawing-out means of the tape drive device 10 advances into the case 16 through the opening aperture 22, hooks on the leader pin 24, and draws out the leader pin 24. The drawing-out means leads the leader pin 24 to the winding reel 38 (and to the clamp member 50 in the insertion-receiving state shown in FIGS. 5A and 6A). As shown in FIGS. 5B and 6A, the leader pin 24 is passed through the window portion 44 of the reel hub 40 and held in the accommodation recess portion 56 of the clamp member 50.

Figure 6B:
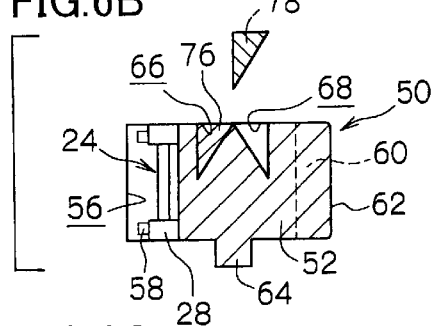

Accordingly, the leader pin 24 attains a state in which the clamp member 50 (the presser springs 58 or protrusions 58A) can resist pulling force of the magnetic tape 12, and the drawing-out means is withdrawn to a position at which the drawing-out means will not interfere with rotation of the winding reel 38. In this state, the air cylinder 72 of the clamp-driving mechanism 70 operates, the rod 72A extends and, as shown in FIG. 6B, the engaging block 76 enters (fits) into the taper hole 66 of the clamp member 50.

Figure 6C:
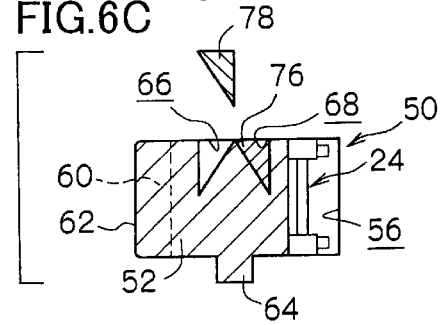
Figure 6D:
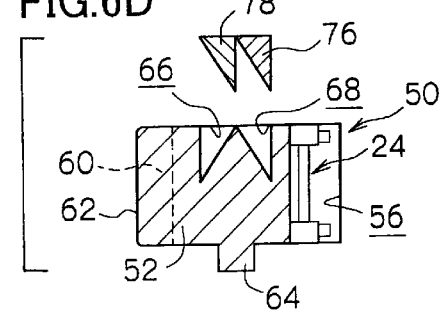

Then, as shown in FIGS. 5C and 6C, the clamp-driving mechanism 70 rotates a half-turn (180°) in the direction of arrow A around the aforementioned center of rotation, and the clamp member 50 reaches a position at which the closing portion 60 faces the window portion 44. Consequently, the clamp member 50 non-removably accommodates the leader pin 24 inside the reel hub 40 and, by the magnetic tape 12 in the vicinity of the leader pin 24 being wound about one of the holding pieces 54 and turned backwards, the clamp member 50 attains a state in which tensions acting in the magnetic tape 12 (pulling forces which act when the winding reel 38 is driven to rotate) can be assuredly resisted. Thereafter, the rod 72A of the air cylinder 72 is retracted and the engaging block 76 is removed from the taper hole 66, as shown in FIG. 6D.

Figure 6E:
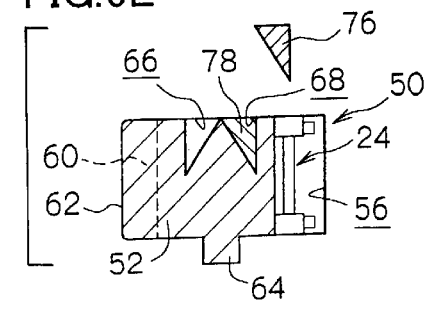

In this state, the air cylinder 74 of the clamp-driving mechanism 70 operates, the rod 74A extends, and the engaging block 78 enters (fits) into the taper hole 66 of the clamp member 50, as shown in FIG. 6E. Consequently, due to a portion of a force that acts in the axial direction when the air cylinder 74 extends the rod 74A being converted into a force in the radial direction by the inclined surfaces of the taper hole 66 and the engaging block 78, the support shaft 64 is guided in the long hole 46 and the clamp member 50 is moved (translated) toward the radial direction outer side of the reel hub 40. Thus, as shown in FIG. 5D, the closing portion 60 enters into the window portion 44.

In this state, the distal end surface 62 of the closing portion 60, which is formed in the circular arc shape, is positioned to be substantially flush with the outer peripheral surface of the reel hub 40 and, together with the outer peripheral surface of the reel hub 40, structures the winding surface for winding the magnetic tape 12 around.

Figure 5E:
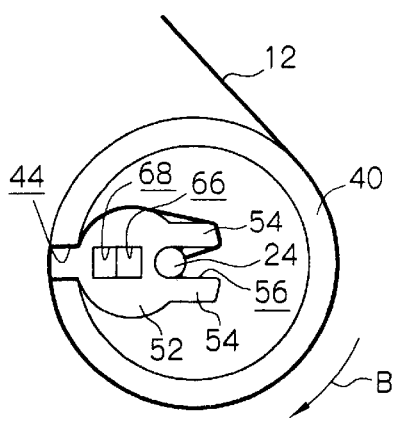

The winding reel 38 (i.e., the reel hub 40) in this state is driven to rotate in the direction of arrow B synchronously with the reel 18 of the recording tape cartridge 14 (and the driving gear) and, as shown in FIG. 5E, the magnetic tape 12 is wound around the winding surface structured by the outer peripheral surface of the reel hub 40 and the distal end surface 62 of the closing portion 60 of the clamp member 50.

Hence, the magnetic tape 12 is wound around the winding reel 38 and is regulated by the rollers 34 to be sequentially pulled out from the case 16 along the predetermined tape path. The recording/replaying head 36, which is disposed along the tape path, acts to record information and/or replay information that has been recorded.

Figure 6F:
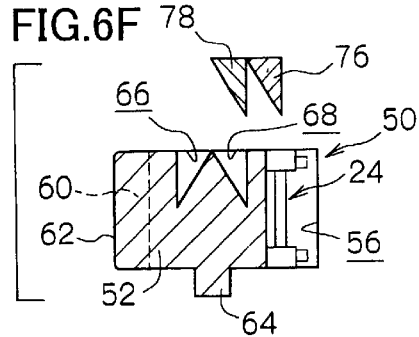
Figure 6G:
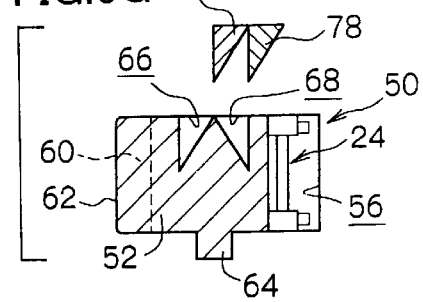

At this time, the clamp-driving mechanism 70 has retracted the rod 74A of the air cylinder 74 and, as shown in FIG. 6F, the engaging block 78 is taken out from the taper hole 66. Thereafter, the whole of the clamp-driving mechanism 70 is counter-rotated and attains a standby state as shown in FIG. 6G.

When the magnetic tape 12 is to be rewound to the reel 18, the winding reel 38 and the reel 18 are driven to rotate in reverse. Thus, the magnetic tape 12 that has been wound around the reel hub 40 of the winding reel 38 is completely unwound and returns to the state of FIG. 5D. Then the air cylinder 72 of the clamp-driving mechanism 70 operates, and extends the rod 72A.

Figure 6H:
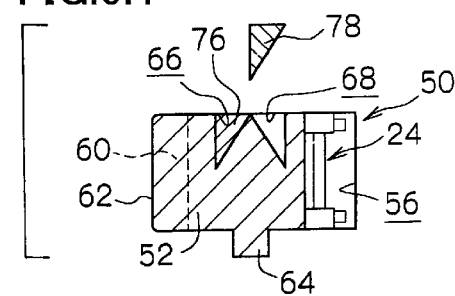

As shown in FIG. 6H, the engaging block 76 enters (fits) into the taper hole 68 of the clamp member 50. Due to a portion of a force that acts in the axial direction when the air cylinder 72 extends the rod 72A being converted into a force in the radial direction by the inclined surfaces of the engaging block 76 and the taper hole 68, the support shaft 64 is guided in the long hole 46 and the clamp member 50 is moved (translated) inward in the radial direction of the reel hub 40. Thus, as shown in FIG. 5C, the closing portion 60 is taken out (withdrawn) from the window portion 44.

Figure 6I:
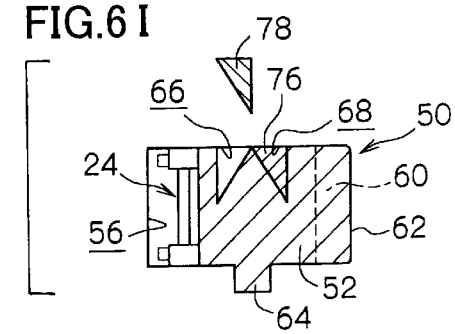

From this state, as shown in FIG. 6I, the clamp-driving mechanism 70 rotates a half-turn around the aforementioned center of rotation, and returns to the state of FIG. 5B, in which the accommodation recess portion 56 of the clamp member 50 communicates with the window portion 44. Then the drawing-out means of the tape drive device 10 removes the leader pin 24 that has been held at the accommodation recess portion 56, and causes the leader pin 24 to be held at a holding position in the case 16 (the recording tape cartridge 14).

Figure 6J:
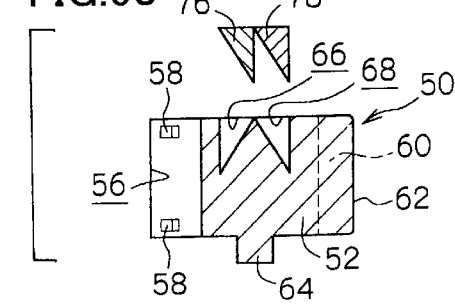

Thus, the clamp member 50 returns to the insertion-receiving state (the initial state). At this time, as shown in FIG. 6J, the rod 72A of the air cylinder 72 retracts and takes the engaging block 76 out from the taper hole 68. Then the clamp-driving mechanism 70 counter-rotates and returns to the state thereof shown in FIG. 6A.

In this process, the closing portion 60 of the clamp member 50 disposed in the reel hub 40 advances to the window portion 44, and the distal end surface 62 of the closing portion 60 structures a portion of the winding surface. That is, the clamp member 50, which is a structural component of the tape drive device 10, structures the portion of the winding surface for winding the magnetic tape 12. Therefore, individual differences of the leader pin 24 has no influence on the winding surface. In other words, steps will not be caused at the winding surface by individual differences of the leader pin 24.

Moreover, the closing portion 60 can be advanced to the window portion 44 of the reel hub 40 by the simple operations of rotating the clamp member 50 provided in the reel hub 40 about the support shaft 64 and moving the clamp member 50 along the long hole 46. Therefore, operational errors are small, and the clamp member 50 can be positioned in the reel hub 40 to structure the winding surface with high accuracy. In particular, due to the clamp member 50 being positioned such that the trunk portion 52 directly abuts against the inner peripheral surface of the reel hub 40 in the state in which the closing portion 60 has advanced into the window portion 44, this positioning accuracy is even further improved.

Accordingly, in the tape drive device 10 relating to this first embodiment, positioning accuracy of the clamp member 50 (the closing portion 60), whose dimensional accuracy can be controlled in accordance with the reel hub 40, can be improved. As a result, steps that are formed in the winding surface structured by the reel hub 40 and the distal end surface 62 of the closing portion 60 can be made smaller. That is, steps that occur in the winding surface of the reel hub 40 of the winding reel 38 can be diminished.

Further, the window portion 44 of the reel hub 40 has an opening width in the outer peripheral surface of the reel hub 40 which, while being sufficient for the small cylindrical leader pin 24 (the engaging portions 28) to be able to pass therethrough, is small. Therefore, the effects of dimensional errors (machining accuracy) of the clamp member 50 (the closing portion 60) are small, which is even more favorable.

In the tape drive device 10, the clamp member 50 disposed in the reel hub 40 half-rotates and accommodates the leader pin 24 in the reel hub 40. Therefore, it is sufficient that the drawing-out means brings the leader pin 24 only as far as a position at which the leader pin 24 is retained in the accommodation recess portion 56, and there is no need for the drawing-out means to be accommodated in the reel hub 40 with the leader pin 24 (and to rotate integrally with the reel hub 40). Therefore, structure of the drawing-out means, and thus of the tape drive device 10, is simplified.

Moreover, the clamp member 50 combines in a single member the function of accommodating the leader pin 24 so as to be able to resist tension of the magnetic tape 12 and the function of entering the window portion 44 of the reel hub 40 to structure the winding surface. Therefore, the number of components in the tape drive device 10 is reduced and the structure of the tape drive device 10 is further simplified.

Winding Reel Modified Example

Next, a modified example of the winding reel of the tape drive device 10 relating to the first embodiment will be described. Components and portions that are essentially the same as in the first embodiment are given the same reference numbers as in the first embodiment, and descriptions thereof will be omitted.

Figure 8:
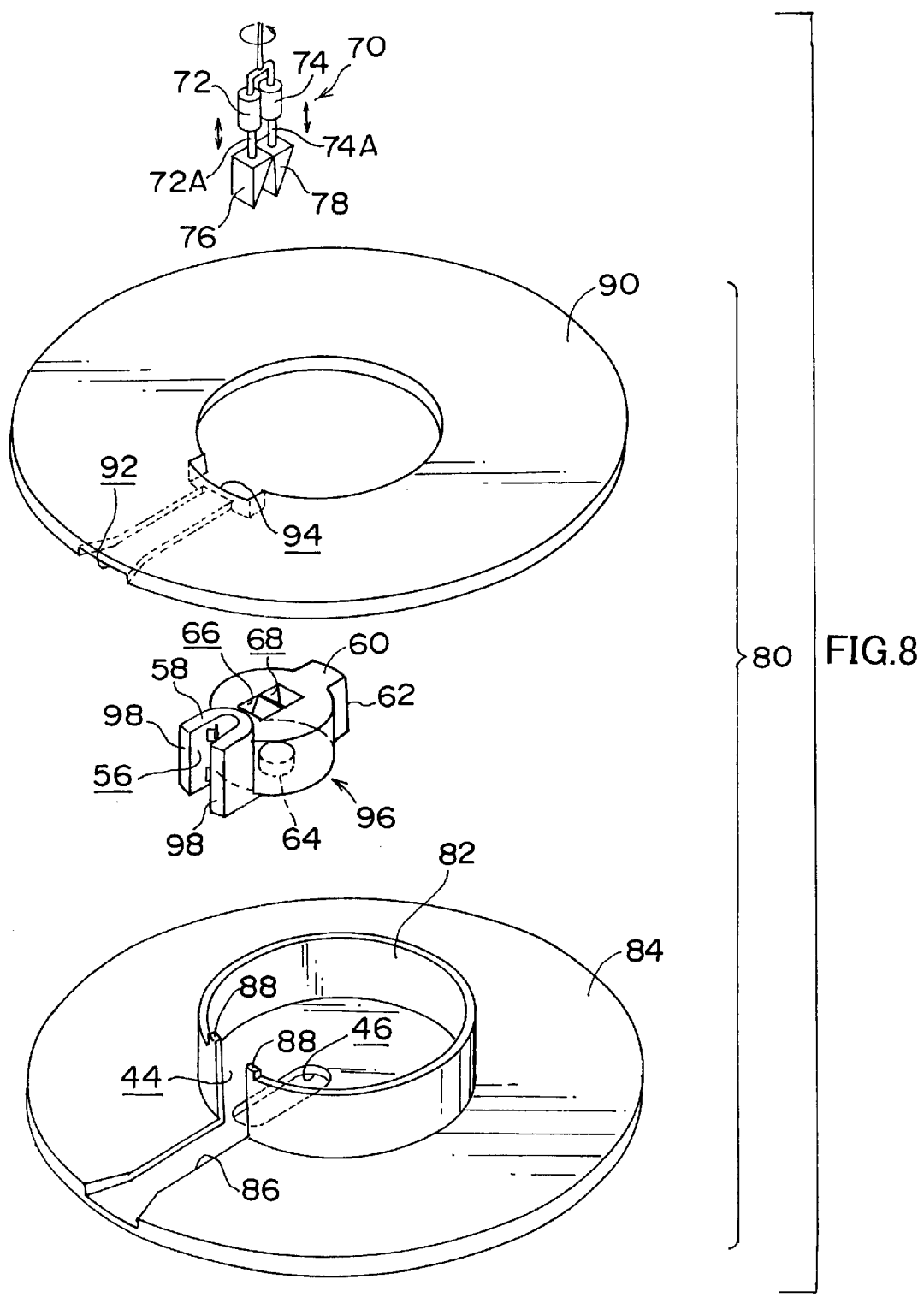
FIG. 8 is an exploded perspective view showing a modified example of the winding reel which structures the tape drive device relating to the first embodiment of the present invention.

FIG. 8 shows an exploded perspective view of the winding reel 80 relating to this modified example. As shown in this drawing, the winding reel 80 is provided with a reel hub 82 which includes the window portion 44. A lower flange 84 is coaxially and integrally provided at a lower end portion of the reel hub 82. An insertion channel 86, which communicates with the window portion 44, is provided in an upper surface of the lower flange 84, along a radial direction of the lower flange 84. A bottom face of an inner side of the reel hub 82 is at the same level as the insertion channel 86, and the long hole 46 is provided in a portion of this bottom face.

A pair of fitting protrusions 88 respectively protrude upward, along inner and outer peripheral surfaces of the reel hub 82, at both sides of an upper end of the window portion 44.

The winding reel 80 is further provided with an upper flange 90. The upper flange 90 is formed in an annular shape whose inner diameter is the same as an inner diameter of the reel hub 82, and whose outer diameter is the same as an outer diameter of the lower flange 84. The upper flange 90 is provided with an insertion channel 92 corresponding to the insertion channel 86 of the lower flange 84. An inner end portion of the insertion channel 92 in the upper flange 90 is provided with a circular arc-form cutaway portion 94, which is fittable with the fitting protrusions 88. Accordingly, the upper flange 90 is fixed to the reel hub 82, in the state in which the cutaway portion 94 is fitted with the fitting protrusions 88 and a lower end surface of an interior peripheral vicinity of the upper flange 90 is abutted against an upper end surface of the reel hub 82.

In this state, the insertion channel 86 of the lower flange 84 and the insertion channel 92 of the upper flange 90 face one another. A facing separation (space) of respective bottom surfaces is slightly greater than the axial direction length of the leader pin 24.

Further, a clamp member 96 is disposed in the reel hub 82 of the winding reel 80. The clamp member 96 is similar to the clamp member 50, except that a pair of holding pieces 98, which structure the accommodation recess portion 56, protrude upward relative to the upper end of the trunk portion 52. That is, although lower end portions of the holding pieces 98 of the clamp member 96 slide at the bottom face at the same level as the insertion channel 86, and thus do not protrude in the axial direction, upper end surfaces of the holding pieces 98 are projected as described above to correspond to the insertion channel 92. Thus, except for the pair of holding pieces 98 (the accommodation recess portion 56), an axial direction dimension of the clamp member 96 is miniaturized by an amount corresponding to one of the engaging portions 28 of the leader pin 24. Of course, the distal end surface 62 of the closing portion 60 has a height sufficient for winding the magnetic tape 12 therearound (i.e., greater than the width of the magnetic tape 12).

In the structure relating to this modified example, all the same effects as in the first embodiment can be provided. In addition, a height of the outer peripheral surface of the reel hub 82 that structures the winding surface onto which the magnetic tape 12 is wound (a facing separation of the upper and lower flanges 84 and upper flange 90 except at the insertion channel 86 and the insertion channel 92) is made smaller than a height according to the reel hub 40. Thus, when the magnetic tape 12 is wound, slippage of the magnetic tape 12 in the width direction thereof ("stepping") can be prevented.

Clamp-Driving Mechanism Modified Example

Next, another modified example of the first embodiment, specifically, a modified example of the clamp member and the clamp-driving mechanism of the tape drive device 10, will be described. Components and portions that are essentially the same as in the first embodiment are given the same reference numbers as in the first embodiment, and descriptions thereof will be omitted.

FIGS. 9A to 9I show a clamp member 100 relating to this other modified example of the first embodiment. The clamp member 100 is different from the clamp member 50 in that taper holes 102 and 104 are provided instead of the taper holes 66 and 68. The taper holes 102 and 104 are provided slightly apart from one another along the radial direction of the trunk portion 52 that runs between the central portion of the accommodation recess portion 56 and the central portion of the closing portion 60. The taper hole 102 is at the accommodation recess portion 56 side, and a surface thereof at the accommodation recess portion 56 side thereof is inclined such that the taper hole 102 has a tapered form which widens toward the opening side thereof (the upper side). The taper hole 104 is at the closing portion 60 side, and a surface thereof at the closing portion 60 side thereof is inclined such that the taper hole 104 has a tapered form which widens toward the opening side thereof (the upper side). Moreover, a vertical surface of the taper hole 104, at the taper hole 102 side thereof, is structured so as to pass along the axial center of the support shaft 64.

A clamp-driving mechanism 106 relating to this modified example is rotatably driveable as a whole around a center of rotation of the clamp member 100 (the axis of the support shaft 64 when the closing portion 60 is at a withdrawn position from the window portion 44), and is provided with the air cylinder 72 (and the rod 72A) at a position which is separated from this rotation axis in correspondence to a separation (distance) between a vertical surface of the taper hole 102 and the vertical surface of the taper hole 104. A wedge-shaped engaging block 108 is provided at the distal end of the rod 72A. The engaging block 108 is formed to correspond to the respective taper holes 102 and 104, and is fittable thereinto. In the initial state, the engaging block 108 is in a state in which the engaging block 108 can be fitted into the taper hole 102 (see FIG. 9A).

Figure 9A:
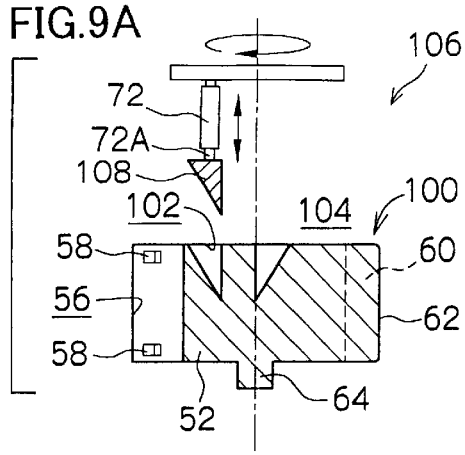
FIGS. 9A to 9I are side sectional views showing a process of driving of a clamp member of another modified example of the tape drive device relating to the first embodiment of the present invention, by a clamp-driving mechanism.
Figure 9F:
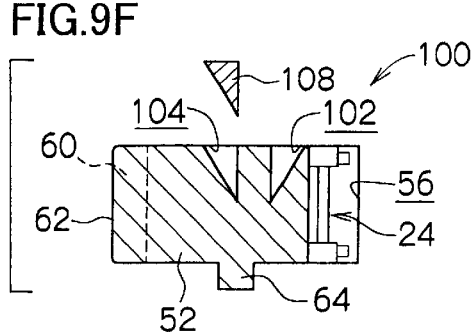
Figure 9B:
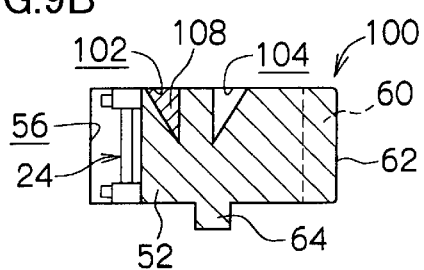
Figure 9G:
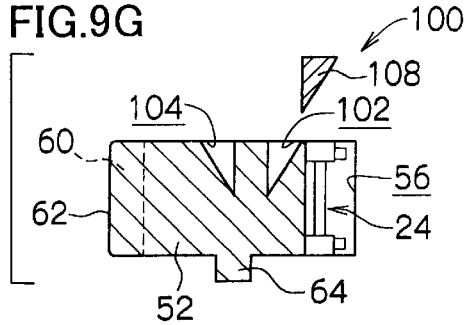
Figure 9C:
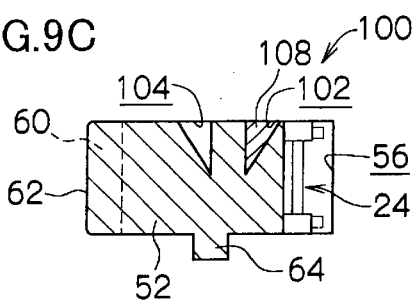

In the structure provided with the clamp member 100 and the clamp-driving mechanism 106 described above, after the insertion-receiving state shown in FIG. 9A, which corresponds to FIG. 5A, the leader pin 24 is caused to be held at the accommodation recess portion 56 of the clamp member 100 as shown in FIG. 9B, which corresponds to FIG. 5B. In addition, the engaging block 108 is fed into the taper hole 102 and the engaging block 108 is half-rotated around the aforementioned center of rotation, as shown in FIG. 9C.

Accordingly, the clamp member 100 attains the state shown in FIG. 5C. In this state, the engaging block 108 is taken out from the taper hole 102 and rotated a half-turn, as shown in FIG. 9D. Then, as shown in FIG. 9E, the engaging block 108 is fed into the taper hole 104 and, due to a portion of a force that acts in the axial direction when the air cylinder 72 extends the rod 72A being converted into a force in the radial direction by the inclined surfaces of the engaging block 108 and the taper hole 104, the support shaft 64 is guided in the long hole 46 and the clamp member 100 is moved (translated) toward outward in the radial direction of the reel hub 40. Thus, the closing portion 60 enters into the window portion 44, as shown in FIG. 5D.

In this state, the distal end surface 62 of the closing portion 60, which is formed in the circular arc shape, is positioned to be substantially flush with the outer peripheral surface of the reel hub 40 and, together with the outer peripheral surface of the window portion 44, structures the winding surface for winding the magnetic tape 12 around. Hence, the magnetic tape 12 is wound onto the winding surface while information is being recorded/replayed in the same manner as in the first embodiment.

At this time, the clamp-driving mechanism 106 retracts the rod 72A of the air cylinder 72 and, as shown in FIG. 9F, the engaging block 108 is taken out from the taper hole 104. Thereafter, the whole of the clamp-driving mechanism 106 is counter-rotated and attains the standby state as shown in FIG. 9G.

When the magnetic tape 12 is to be rewound to the reel 18, the magnetic tape 12 that has been wound around the reel hub 40 of the winding reel 38 is completely unwound and returns to the state of FIG. 5D. Then, the air cylinder 72 of the clamp-driving mechanism 106 operates and extends the rod 72A.

Figure 9H:
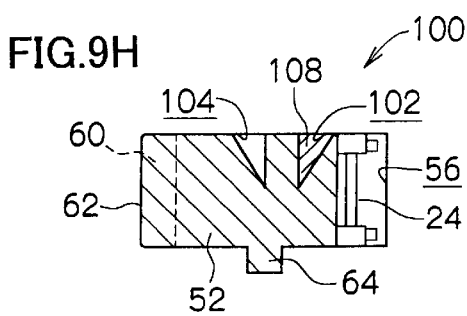
Figure 9D:
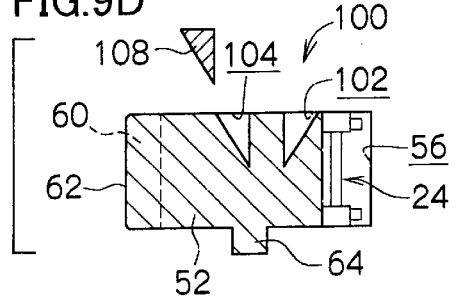

Thus, as shown in FIG. 9H, the engaging block 108 enters (fits) into the taper hole 102 of the clamp member 100. Due to a portion of a force that acts in the axial direction when the air cylinder 72 extends the rod 72A being converted into a force in the radial direction by the inclined surfaces of the engaging block 108 and the taper hole 102, the support shaft 64 is guided in the long hole 46 and the clamp member 100 is moved (translated) inward in the radial direction of the reel hub 40. Thus, as shown in FIG. 5C, the closing portion 60 is removed (withdrawn) from the window portion 44.

Figure 9I:
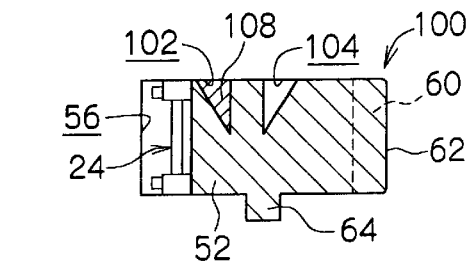
Figure 9E:
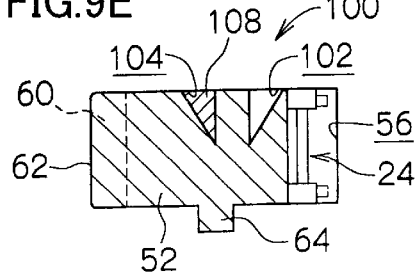

From this state, as shown in FIG. 9I, the clamp-driving mechanism 106 rotates a half-turn around the center of rotation, and the clamp-driving mechanism 106 returns to the state of FIG. 5B, in which the accommodation recess portion 56 of the clamp member 100 communicates with the window portion 44. The leader pin 24 that has been held at the accommodation recess portion 56 is taken out, and thus the clamp member 100 returns to the insertion-receiving state (the initial state). At this time, the rod 72A of the air cylinder 72 retracts and takes the engaging block 108 out from the taper hole 102, thus returning to the state of FIG. 9A.

Accordingly, in the structure relating to this modified example, all the same effects as in the first embodiment can be provided. In addition, because only one air cylinder, the air cylinder 72, and one engaging block, the engaging block 108, are required, the number of components is reduced.

Structure of Winding Reel Relating to Second Embodiment

Next, the winding reel 110 relating to a second embodiment of the tape drive device 10 will be described on the basis of FIGS. 10, 11A and 11B. Components and portions that are essentially the same as in the first embodiment are given the same reference numbers as in the first embodiment, and descriptions thereof will be omitted.

Figure 10:
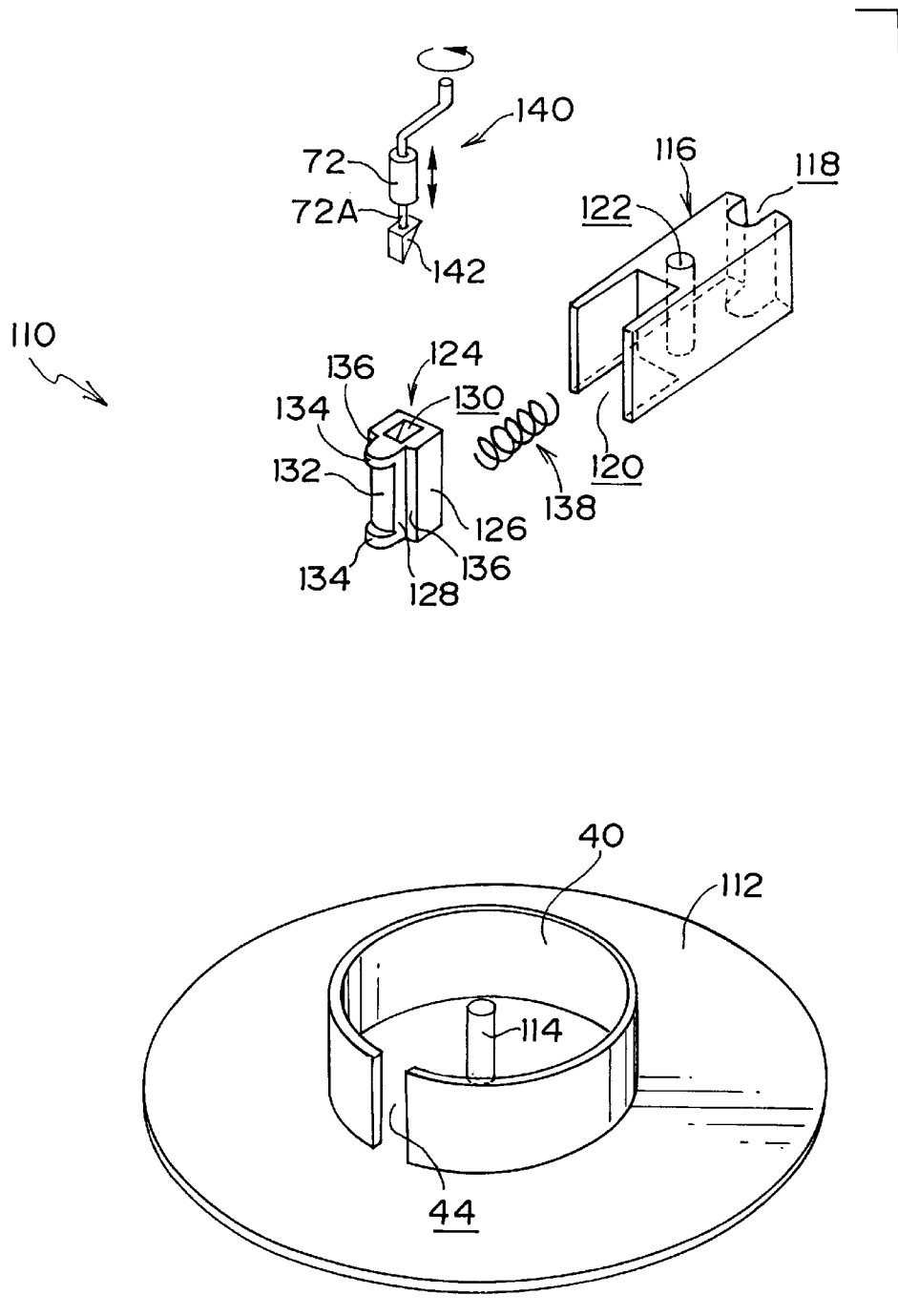
FIG. 10 is an exploded perspective view showing a winding reel of a tape drive device relating to a second embodiment of the present invention.

As shown in an exploded perspective view in FIG. 10 (from which illustration of an upper flange is omitted), the winding reel 110 is provided with the reel hub 40, in which the window portion 44 is formed. A lower flange 112 is coaxially and integrally provided with the reel hub 40. A support shaft 114 is provided protruding to an upper side from a portion of the lower flange 112 that is inside the reel hub 40 (the bottom face of the reel hub 40). An axial center of the support shaft 114 corresponds to the axial center of the reel hub 40. The upper flange 48 is coaxially fixed at the upper end side of the reel hub 40.

An accommodation block 116, which serves as an accommodation member, is disposed in the reel hub 40. The accommodation block 116 is formed in a substantially rectangular shape whose height (length in the axial direction) is the same as the height of the reel hub 40. An accommodation recess portion 118, which is substantially U-shaped in plan view, is provided along the whole of this height at one end portion in a longitudinal direction of the accommodation block 116. A clamp accommodation portion 120, which is shaped substantially like a three-sided box in plan view, is provided along the whole height at the other end in the longitudinal direction of the accommodation block 116.

A width of the accommodation recess portion 118 is set to be the same as the width of the window portion 44, and an inner (recessed) end of the accommodation recess portion 118 is formed in a circular arc shape with a diameter slightly greater than the engaging portions 28 of the leader pin 24. Thus, the leader pin 24 can be inserted into the accommodation recess portion 118. An end portion of the accommodation block 116 at the side at which the accommodation recess portion 118 is provided is curved to correspond to the inner surface of the reel hub 40. The presser springs 58, the protrusions 58A or the like may be provided at this accommodation recess portion 118. However, this second embodiment is structured without the presser springs 58 or the protrusions 58A being provided.

A shaft hole 122 is provided at a substantially central portion of the accommodation block 116, and penetrates along the whole height thereof. By the support shaft 114 being inserted into this shaft hole 122, the accommodation block 116 is supported so as to be freely rotatable relative to the reel hub 40. A distance from an axial center of the shaft hole 122 to the accommodation recess portion 118 side end portion of the accommodation block 116 is set to be slightly smaller than the internal radius of the reel hub 40. As will be explained later, when the accommodation block 116 rotates around the support shaft 114, the leader pin 24 cannot be taken out from between the accommodation recess portion 118 and the reel hub 40.

On the other hand, a distance from the axial center of the shaft hole 122 to an end portion of the accommodation block 116 at the clamp accommodation portion 120 side is set to be significantly smaller than the internal radius of the reel hub 40. An opening width of the clamp accommodation portion 120 is set to be wider than the window portion 44. A clamp member 124, which serves as a closing member, is insertedly provided inside the clamp accommodation portion 120.

The clamp member 124 is integrally formed with a support portion 126 and a closing portion 128. The support portion 126 is slideably (moveably along the longitudinal direction of the accommodation block 116) inserted at the clamp accommodation portion 120. The closing portion 128 is provided at one end portion of the support portion 126, and protrudes from an opening end of the clamp accommodation portion 120.

The support portion 126 is formed in a rectangular shape in plan view, whose width corresponds to a width of the clamp accommodation portion 120. A taper hole 130, which has a rectangular-shaped opening, is provided at an upper end of the support portion 126. A surface of the taper hole 130 that is disposed at the shaft hole 122 side of the taper hole 130 when the support portion 126 is in an accommodated state in the clamp accommodation portion 120 is inclined such that the taper hole 130 has a tapered form which widens toward the opening side thereof (the upper side).

A width of the closing portion 128 is such that the closing portion 128 can be inserted (advanced) into the window portion 44 while nipping a single layer of the magnetic tape 12. A length of the closing portion 128 (a protrusion amount from the support portion 126) is the same as the thickness of the reel hub 40. A distal end surface 132 of the closing portion 128 is formed in a circular arc shape corresponding to the outer peripheral surface of the reel hub 40. Accordingly, when the closing portion 128 is advanced into the window portion 44, the closing portion 128 closes the window portion 44 (while nipping the magnetic tape 12) and, together with the outer peripheral surface of the reel hub 40, the distal end surface 132 of the closing portion 128 structures the winding surface around which the magnetic tape 12 is wound.

In addition, a pair of hilt portions 134 is provided projecting from the distal end surface 132 at upper and lower end portions of the closing portion 128. The hilt portions 134 are structured for sliding against the inner peripheral surface of the reel hub 40 (i.e., for protecting the distal end surface 132). A height of each of the hilt portions 134 is slightly smaller than the heights of the engaging portions 28. Therefore, a facing separation (space) of the pair of hilt portions 134 (that is, a height of the distal end surface 132 of the closing portion 128) is slightly greater than the width of the magnetic tape 12. Further, step portions 136 from the closing portion 128 to the support portion 126 are formed in circular arc shapes to correspond to the inner peripheral surface of the reel hub 40.

A compression coil spring 138, which serves as urging means, is provided between an inner end portion of the clamp accommodation portion 120 of the accommodation block 116 and the clamp member 124 (the support portion 126). The compression coil spring 138 constantly urges the clamp member 124 outward in the radial direction of the reel hub 40. Note that, because the accommodation block 116 is supported by the support shaft 114 at the shaft hole 122, the accommodation block 116 resists the urging force of the compression coil spring 138.

The accommodation block 116 and the clamp member 124 described above are driven by a clamp-driving mechanism 140. The clamp-driving mechanism 140 is rotatably driveable as a whole around an axis which coincides with the axis of the support shaft 114. The clamp-driving mechanism 140 is provided with the air cylinder 72 (and the rod 72A) at a position which is separated from this rotation axis in accordance with a separation (distance) between the rotation axis and the taper hole 130. A wedge-shaped engaging block 142 is provided at the distal end of the rod 72A. The engaging block 142 is formed to correspond to the respective taper hole 130 of the clamp member 124, and is fittable thereinto. The engaging block 142 is set to be fittable into the taper hole 130 in the initial state.

In the winding reel 110 provided with the accommodation block 116 and the clamp member 124 described above (the tape drive device 10 relating to the second embodiment), in the initial state, the accommodation recess portion 118 of the accommodation block 116 is set to an insertion-receiving state communicating with the window portion 44 of the reel hub 40. The clamp member 124 abuts against the inner peripheral surface of the reel hub 40, via the hilt portions 134.

Figure 11A:
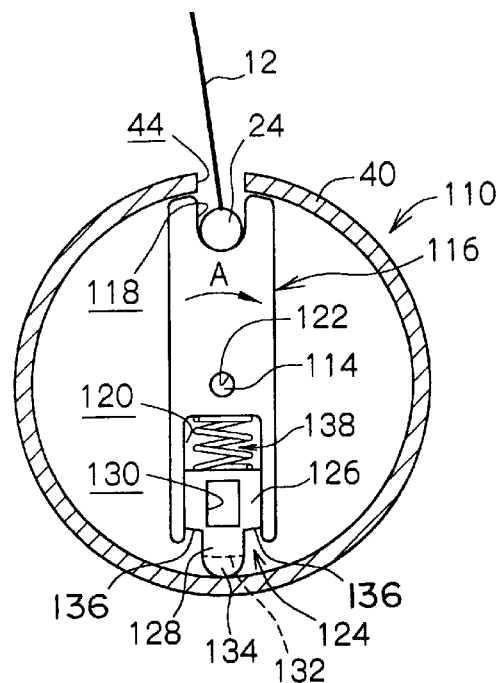
FIGS. 11A and 11B are views showing a process of operation of a clamp member in the winding reel of the tape drive device relating to the second embodiment of the present invention.

When the leader pin 24 is accommodated in the accommodation recess portion 118, as shown in FIG. 11A, the engaging block 142 of the clamp-driving mechanism 140 enters into the taper hole 130 of the clamp member 124 and rotates about the aforementioned axis. Thus, the hilt portions 134 of the clamp member 124 slide against the inner peripheral surface of the reel hub 40 while the accommodation block 116 rotates in the direction of arrow A around the support shaft 114. Accordingly, the leader pin 24 is non-removably held between the accommodation recess portion 118 and the inner peripheral surface of the reel hub 40, and attains a state in which pulling force of the magnetic tape 12 can be resisted.

Figure 11B:
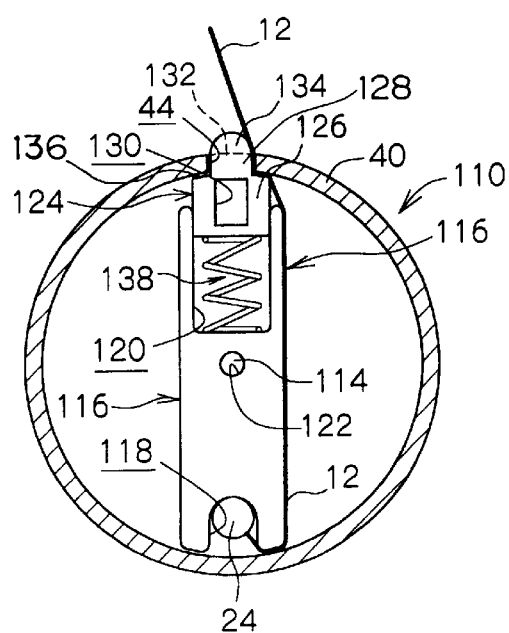

When the accommodation block 116 has rotated a half-turn from the initial state, the clamp member 124 is moved (translated) toward the opening end side of the clamp accommodation portion 120 by the urging force of the compression coil spring 138, as shown in FIG. 11B. The closing portion 128 of the clamp member 124 advances to the window portion 44 of the reel hub 40, and the step portions 136 of the support portion 126 abut against and are positioned at the inner peripheral surface of the reel hub 40. Consequently, the distal end surface 132 of the closing portion 128 structures the winding surface around which the magnetic tape 12 is wound, together with the outer peripheral surface of the reel hub 40. Hence, the magnetic tape 12 is wound onto the winding surface while recording/replaying of information is carried out in the same manner as in the first embodiment.

When the magnetic tape 12 has been wound around the winding surface and has been completely unwound again, the engaging block 142 of the clamp-driving mechanism 140 again enters into the taper hole 130 of the clamp member 124, which is protruded outward in the radial direction of the reel hub 40 (i.e., the closing portion 128 has advanced to the window portion 44). Due to a portion of a force that acts in the axial direction when the air cylinder 72 extends the rod 72A being converted into a force in the radial direction by the inclined surfaces of the engaging block 142 and the taper hole 130, the clamp member 124 moves inward in the radial direction of the reel hub 40 against the urging force of the compression coil spring 138. Thus, the clamp member 124 moves deeper into the clamp accommodation portion 120 of the accommodation block 116, and the closing portion 128 is taken out (withdrawn) from the window portion 44.

Here, the distal end surface 132 of the clamp member 124 provided in the reel hub 40 structures the winding surface. Therefore, steps in the winding surface due to individual differences of the leader pin 24 will not occur. Moreover, the closing portion 128 can be advanced to the window portion 44 by the simple operations of rotating the clamp member 124 about the support shaft 114 and the clamp member 124 moving along the clamp accommodation portion 120. Therefore, operational errors are small, and the clamp member 124 can be positioned in the reel hub 40 to structure the winding surface with high accuracy. In particular, due to the clamp member 124 being positioned such that the step portions 136 directly abut against the inner peripheral surface of the reel hub 40 in the state in which the closing portion 128 has advanced into the window portion 44, this positioning accuracy is even further improved. Accordingly, positioning accuracy of the clamp member 124 (the closing portion 128), whose dimensional accuracy can be controlled in accordance with the reel hub 40, can be improved. As a result, steps that are formed in the winding surface structured by the reel hub 40 and the distal end surface 132 of the closing portion 128 can be made small.

Moreover, it is suffices that the drawing-out means brings the leader pin 24 only as far as a position at which the leader pin 24 is retained at the accommodation recess portion 118, and structure of the drawing-out means, and thus of the tape drive device 10, is simplified.

Consequently, with a structure relating to the second embodiment, which is provided with the winding reel 110 (the accommodation block 116, the clamp member 124 and the like) instead of the winding reel 38, all the same effects as in the first embodiment can be provided. Moreover, because advancement of the clamp member 124 to the window portion 44 is performed by the urging force of the compression coil spring 138, operation (that is, structure) of the clamp-driving mechanism 140 is simplified.

In the second embodiment described above, the clamp member 124 is structured to be advanced to the window portion 44 by the urging force of the compression coil spring 138. However, the present invention is not limited thus. For example, the structure may be provided with a solenoid instead of the compression coil spring 138. In such a case, a structure in which a drive shaft of the solenoid is urged in an extending direction (the direction of advancement of the closing portion 128 to the window portion 44) by a return spring and is retracted when electricity is applied is desirable. In such a structure, the clamp-driving mechanism 140 can be even further simplified. In addition, a driving mechanism that directly drives the accommodation block 116 to rotate (for example, a mechanism in which the support shaft 64 is provided at the accommodation block 116 and the mechanism transmits rotary force to the support shaft 64) may be provided instead of the clamp-driving mechanism 140 (and the taper hole 130).

Structure of Winding Reel Relating to Third Embodiment

Next, the winding reel 150 relating to a third embodiment structuring the tape drive device 10 will be described on the basis of FIGS. 12A to 12C. Components and portions that are essentially the same as in the first or second embodiment are given the same reference numbers as in the first or second embodiment, and descriptions thereof will be omitted.

Figure 12A:
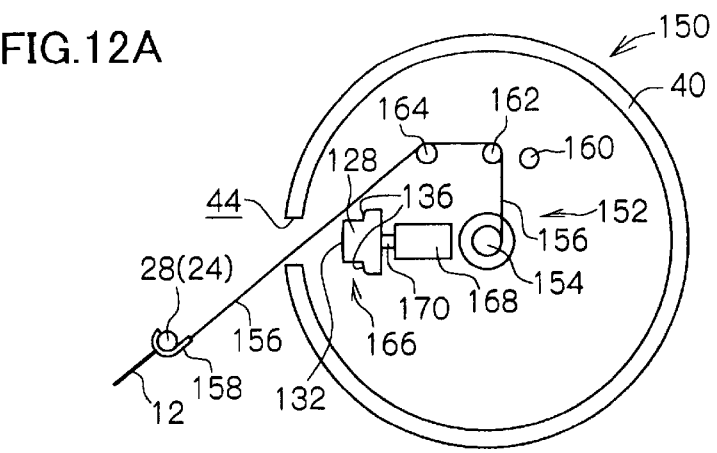
FIGS. 12A to 12C are diagrams showing a winding reel which structures a tape drive device relating to a third embodiment of the present invention.
Figure 12B:
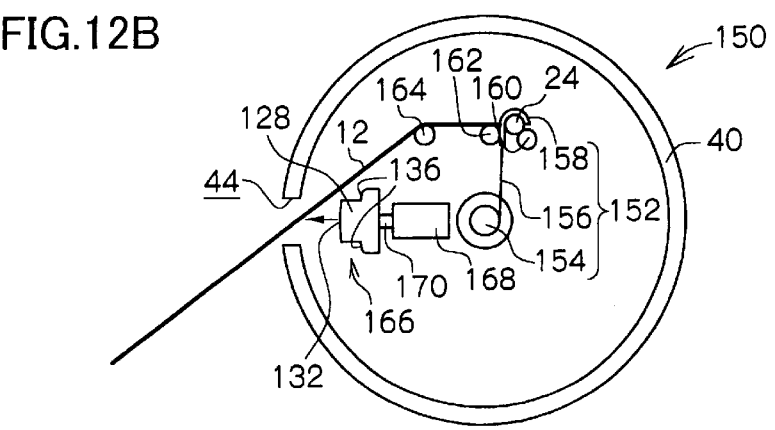
Figure 12C:
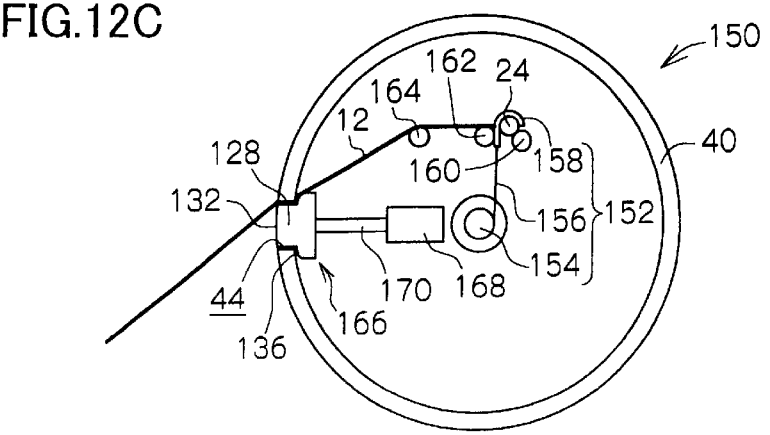

FIG. 12A shows the winding reel 150 in plan view, with upper and lower flanges omitted from the illustration. As shown in this drawing, the winding reel 150 is provided with the reel hub 40 which includes the window portion 44. A drawing-out component 152 is provided at the inner side of the reel hub 40.

The drawing-out component 152 is provided with a drawing-out tape winding shaft 154, which is disposed at an axial center portion of the reel hub 40 and is driven to rotate independently of the reel hub 40. One end portion of a drawing-out tape 156 is fixed at the drawing-out tape winding shaft 154. This drawing-out tape 156 is structured to be wound up at the drawing-out tape winding shaft 154 when the drawing-out tape winding shaft 154 is driven to rotate. A pair of upper and lower hook portions 158, which are capable of hooking on the engaging portions 28 of the leader pin 24, is attached at another end portion of the drawing-out tape 156.

Accordingly, in this structure, when the drawing-out tape winding shaft 154 is driven to rotate in a state in which the hook portions 158 have hooked on the engaging portions 28 of the leader pin 24, the magnetic tape 12 is drawn out from the case 16 of the recording tape cartridge 14, and the leader pin 24 can be accommodated in the reel hub 40.

A pair of engaging protrusions 160 and 162 and a guide protrusion 164 are provided standing inside the reel hub 40. The engaging protrusions 160 and 162 engage and retain the hook portions 158 together with the accommodated leader pin 24. Together with the engaging protrusion 162, the guide protrusion 164 regulates a path of the magnetic tape 12 inside the reel hub 40. The engaging protrusion 162 and the guide protrusion 164 may be supported to be freely rotatable with rollers therearound or the like.

A clamp member 166 is also disposed inside the reel hub 40. The clamp member 166 is structured to be provided with the closing portion 128, the distal end surface 132 and the step portions 136. The structure of the clamp member 166 is substantially the same as the clamp member 124 of the second embodiment, except that the taper hole 130 and the hilt portions 134 are not provided.

A clamp-driving mechanism 168 is connected at an end portion of the clamp member 166 at a side of the clamp member 166 opposite to a side thereof at which the closing portion 128 is disposed. The clamp-driving mechanism 168 is capable of extending and retracting a driving shaft 170, which is connected to the clamp member 166. Therefore, in a state in which the driving shaft 170 is retracted, the closing portion 128 is maintained in a withdrawn state relative to the window portion 44 (see FIG. 12B). When the driving shaft 170 is extended, the closing portion 128 is advanced to the window portion 44 (see FIG. 12C).

The clamp-driving mechanism 168 may be structured with a solenoid, an electric motor or the like, or an air cylinder, and the clamp-driving mechanism 168 may be structured in the same way as the clamp-driving mechanism 106 or the like, with a taper-form engaging block and a taper hole (which may be provided at the driving shaft 170) which can convert a displacement force in the axial direction to a displacement force in the radialal direction.

In the winding reel 150 provided with the drawing-out component 152 and the clamp member 166 described above (the tape drive device 10 relating to the third embodiment), when the recording tape cartridge 14 is loaded at the cartridge accommodation section 32 and the opening aperture 22 is opened, an unillustrated chucking mechanism hooks the hook portions 158 onto the engaging portions 28 of the leader pin 24. In this state, the drawing-out tape winding shaft 154 is driven to rotate. The drawing-out tape 156 is wound up at the drawing-out tape winding shaft 154 and the leader pin 24 is accommodated in the reel hub 40.

When the leader pin 24 is engaged and retained between the engaging protrusions 160 and 162 by pulling force of the drawing-out tape 156, the clamp-driving mechanism 168 extends the driving shaft 170 and the closing portion 128 of the clamp member 166 advances to the window portion 44 of the reel hub 40. Consequently, in a state in which the clamp member 166 is positioned with the step portions 136 abutting against the inner peripheral surface of the reel hub 40, the distal end surface 132, together with the outer peripheral surface of the reel hub 40, structures the winding surface onto which the magnetic tape 12 is wound. Hence, the magnetic tape 12 is wound around the winding surface while recording/replaying of information is carried out in the same way as in the first embodiment.

When the magnetic tape 12 has been wound around the winding surface and has been completely unwound again, the clamp-driving mechanism 168 retracts the driving shaft 170, and removes (withdraws) the closing portion 128 from the window portion 44. Then, the drawing-out tape winding shaft 154 and the reel 18 are driven to rotate in reverse in the synchronous manner, the hook portions 158 (and the drawing-out tape 156) return to initial positions thereof, and the aforementioned chucking mechanism causes the leader pin 24 to be held at the case 16.

Here, the distal end surface 132 of the clamp member 166 provided in the reel hub 40 structures the winding surface. Therefore, steps in the winding surface due to individual differences of the leader pin 24 will not occur. Moreover, the closing portion 128 can be advanced to the window portion 44 just by a simple (translating) movement of the clamp member 166. Therefore, operational errors are small, and the clamp member 166 can be positioned in the reel hub 40 to structure the winding surface with high accuracy. In particular, due to the clamp member 166 being positioned such that the step portions 136 directly abut against the inner peripheral surface of the reel hub 40 in the state in which the closing portion 128 has advanced into the window portion 44, this positioning accuracy is even further improved. Accordingly, positioning accuracy of the clamp member 166 (the closing portion 128), whose dimensional accuracy can be controlled in accordance with the reel hub 40, can be improved. As a result, steps that are formed in the winding surface structured by the reel hub 40 and the distal end surface 132 of the closing portion 128 can be made small.

Consequently, with a structure relating to the third embodiment, which is provided with the winding reel 150 (the drawing-out component 152, the clamp member 166 and the like) instead of the winding reel 38, the same effect as in the first embodiment can be provided, in that steps that occur at the winding surface can be made smaller. Specifically, the closing member of the present invention (the clamp member 166 in this third embodiment) can be provided separately from a function (member) for accommodating and retaining the leader pin 24 inside the reel hub 40.

The present invention is not limited to the structures illustrated in the above-described embodiments and modified examples. The present invention can be structured by appropriately combining (substituting) the principal structural elements that have been illustrated. Thus, for example, the clamp member 50 (the support shaft 64) may be urged (driven) by the compression coil spring 138, a solenoid or the like which is disposed at the long hole 46 (the first embodiment combined with the second embodiment). In an alternative, the hilt portions 134 of the clamp member 124 (the upper and lower end portions of the closing portion 128 of the clamp member 166) may be structured to be able to advance and withdraw along the insertion channel 86 and the insertion channel 92 for preventing stepping (the modified example of the first embodiment combined with the second embodiment). In another alternative, the drawing-out tape winding shaft 154 may be provided in the shaft hole 122 of the accommodation block 116, with the drawing-out tape 156 passing through a slit which communicates between the shaft hole 122 and the accommodation recess portion 118, and the drawing-out component 152 being structured to accommodate the leader pin 24 at the accommodation recess portion 118 (the second embodiment combined with the third embodiment).

Further, the above-described embodiments and modified examples have been structured such that a portion of a part of the clamp member 50, 96, 100, 124 or 126 that abuts against the inner peripheral surface of the reel hub 40 or 82 (the trunk portion 52 or the step portions 136) nips the magnetic tape 12 against the inner peripheral surface of the reel hub 40 or the like. However, the present invention is not limited thus. For example, the trunk portion 52 or the step portions 136 may be structured to be provided, at a vertical direction central portion thereof, with a recess portion through which the magnetic tape 12 can pass.

Still further, the above-described embodiments and modified examples have been structured with the recording tape cartridge 14 that is utilized at the tape drive device 10 being provided with the leader pin 24 as the leader member. However, the present invention is not limited thus. The tape drive device 10 may be able to utilize a recording tape cartridge which is provided with, for example, a plate-form or block-form leader member.

Further again, the above-described embodiments and modified examples have been structured with the recording tape cartridge 14 that is utilized at the tape drive device 10 employing the magnetic tape 12 as a recording tape. However, the present invention is not limited thus. It is sufficient that the recording tape is one of long tape-form information recording/replaying media which can record information and replay information that has been recorded. Of course, the tape drive device 10 relating to the present invention can be applied to any recording tape cartridge that employs recording tape of any kind of recording/replaying system.

The tape drive device relating to the present invention as described above has the excellent effect of being able to diminish steps that occur at a winding surface of a reel hub of a winding reel.

What is claimed is:

1. A tape drive device that winds a recording tape, which is provided with a leader member at a distal end portion thereof, at a winding reel while carrying out at least one of recording of information to the recording tape and replaying of information that has been recorded to the recording tape, the tape drive device comprising:
   a hollow reel hub which structures the winding reel and includes an outer peripheral surface which constitutes a winding surface for the recording tape;
   a window portion formed penetrating through a peripheral wall of the reel hub, the leader member being passable through the window portion; and
   a closing member disposed entirely within the reel hub, the closing member being advanceable and withdrawable with respect to the window portion and, when the leader member has entered into the reel hub, the closing member advancing from within the reel hub to the window portion and structuring a portion of the winding surface.

2. The tape drive device of claim 1, further comprising:
   a winding shaft disposed in the reel hub, which is driven to rotate independently of the reel hub;
   a tape member including two ends, a holding member capable of holding the leader member being connected to one end of the tape member, and the other end being fixed to the winding shaft, the tape member being wound at the winding shaft by rotation of the winding shaft; and
   a catching member for preventing the tape member from being completely wound up at the winding shaft,
   wherein the leader member is drawn into the reel hub by the holding member holding the leader member and the winding shaft being driven to rotate and winding the tape member, and the closing member advances to the window portion after winding of the tape member has been stopped by the catching member.

3. A tape drive device of claim 1, wherein the closing member is capable of gripping the recording tape.

4. A tape drive device of claim 1, wherein the closing member advances from within the reel hub toward a radially outer direction of the reel hub.

5. A tape drive device that winds a recording tape, which is provided with a leader member at a distal end portion thereof, at a winding reel while carrying out at least one of recording of information to the recording tape and replaying of information that has been recorded to the recording tape, the tape drive device comprising:
   a hollow reel hub which structures the winding reel and includes an outer peripheral surface which constitutes a winding surface for the recording tape;
   a window portion formed Penetrating through a peripheral wall of the reel hub, the leader member being passable through the window portion;
   a closing member disposed in the reel hub, the closing member being advanceable and withdrawable with respect to the window portion and, when the leader member has entered into the reel hub, the closing member advancing to the window portion and structuring a portion of the winding surface;
   a driving mechanism for driving the closing member, wherein the closing member comprises a portion for holding the leader member and a distal end surface portion which structures a portion of the winding surface in a state in which the closing member has advanced to the window portion, and wherein, when the leader member has arrived at the leader member holding portion through the window portion and is held by the holding portion, the closing member is driven by the driving mechanism and the distal end surface portion advances to the window portion.

6. The tape drive device of claim 5, wherein the closing member is structured to be rotatable and linearly displaceable and, when the leader member is held by the leader member holding portion, the driving mechanism causes the distal end surface portion to face the window portion by rotating the closing member through a certain angle and advances the distal end surface portion to the window portion by translating the closing portion.

7. The tape drive device of claim 6, wherein the certain angle is substantially 180°.

8. The tape drive device of claim 6, wherein the driving mechanism carries out rotation and linear displacement of the closing member with a single member.

9. The tape drive device of claim 8, wherein the closing member includes an engaging hole for engaging with the driving mechanism, and the engaging hole having a form capable of converting displacement of the driving mechanism in the direction of a rotation axis of the closing member into displacement of the closing member in a radial direction of the closing member when the driving mechanism is inserted into the engaging hole.

10. The tape drive device of claim 6, wherein heights, in the direction of a rotation axis of the closing member, of portions of the closing member other than the leader member holding portion are substantially the same as a width of the recording tape.

11. A tape drive device that winds a recording tape, which is provided with a leader member at a distal end portion thereof, at a winding reel while carrying out at least one of recording of information to the recording tape and replaying of information that has been recorded to the recording tape, the tape drive device comprising:

a hollow reel hub which structures the winding reel and includes an outer peripheral surface which constitutes a winding surface for the recording tape;

a window portion formed penetrating through a peripheral wall of the reel hub, the leader member being passable through the window portion;

a closing member disposed in the reel hub, the closing member being advanceable and withdrawable with respect to the window portion and, when the leader member has entered into the reel hub, the closing member advancing to the window portion and structuring a portion of the winding surface, further comprising a driving mechanism for driving the closing member, wherein the closing member comprises a portion for accommodating the leader member and a distal end surface portion which structures a portion of the winding surface in a state in which the closing member has advanced to the window portion, and wherein, in a state in which the leader member is accommodated at the leader member accommodating portion, the closing member is driven by the driving mechanism such that the distal end surface portion advances to the window portion while the leader member remains accommodated at the leader member accommodating portion.

12. The tape drive device of claim 11, wherein the closing member is structured to be rotatable, the distal end surface portion is structured to be movable in a radial direction of the closing member and is urged outward in the radial direction, and when, as a result of the driving mechanism rotating the closing member through a certain angle, the distal end surface portion faces the window portion, the urged distal end surface portion advances to and is positioned at the window portion.

13. The tape drive device of claim 12, a distance from a rotation axis of the closing member to a distal end of the leader member accommodating portion is shorter than an interior radius of the reel hub.

14. The tape drive device of claim 12, wherein the certain angle is substantially 180°.

15. The tape drive device of claim 11, wherein the leader member accommodating portion comprises a structure capable of holding the leader member.

16. A tape drive device for winding a recording tape, which is provided with a leader member at a distal end portion thereof, at a winding reel, the tape drive device comprising:

a hollow reel hub which structures the winding reel and includes an outer peripheral surface which constitutes a winding surface for the recording tape;

a window portion formed penetrating through a peripheral wall of the reel hub, the leader member being passable through the window portion; and a closing member disposed in the reel hub, the closing member being capable of accommodating the leader member therein and capable of advancing and retreating with respect to the window portion and, in a state in which the closing member accommodates the leader member, the closing member advancing from within the reel hub to the window portion and structuring a portion of the winding surface.

17. A tape drive device for winding a recording tape, which is provided with a leader member at a distal end portion thereof, at a winding reel, the tape drive device comprising:

a hollow reel hub which structures the winding reel and includes an outer peripheral surface which constitutes a winding surface for the recording tape;

a window portion formed Penetrating through a peripheral wall of the reel hub, the leader member being passable through the window portion; and a closing member disposed in the reel hub, the closing member being capable of at least one of holding and accommodating the leader member and being advanceable and withdrawable with respect to the window portion and, in a state in which the closing member at least one of holds and accommodates the leader member, the closing member advancing to the window portion and structuring a portion of the winding surface; and a driving mechanism for driving the closing member, wherein the closing member comprises a portion for at least one of holding and accommodating the leader member, and a distal end surface portion which structures a portion of the winding surface in a state in which the closing member has advanced to the window portion, and wherein, in a state in which the leader member is at least one of held and accommodated at the leader member holding/accommodating portion, the closing member is driven by the driving mechanism and the distal end surface portion advances to the window portion.

18. The tape drive device of claim 17, wherein the closing member is structured to be rotatable and linearly displaceable and, in a state in which the leader member is held at the leader member holding/accommodating portion, the driving mechanism causes the distal end surface portion to face the window portion by rotating the closing member through a certain angle and advances the distal end surface portion to the window portion by translating the closing portion.

19. The tape drive device of claim 18, wherein the certain angle is substantially 180°.

20. The tape drive device of claim 18, wherein the driving mechanism carries out rotation and linear displacement of the closing member with a single member.

21. The tape drive device of claim 18, wherein heights, in the direction of a rotation axis of the closing member, of portions of the closing member other than the leader member holding/accommodating portion are substantially the same as a width of the recording tape.

22. The tape drive device of claim 17, wherein the closing member is structured to be rotatable, the distal end surface portion is structured to be movable in a radial direction of the closing member and is urged outward in the radial direction, and when, as a result of the driving mechanism rotating the closing member through a certain angle, the distal end surface portion faces the window portion, the urged distal end surface portion advances to and is positioned at the window portion.

23. The tape drive device of claim 17, wherein a distance from a rotation axis of the closing member to a distal end of the leader member holding/accommodating portion is shorter than an interior radius of the reel hub.

24. A tape drive device for winding a recording tape, which is provided with a leader member at a distal end portion thereof, at a winding reel, the tape drive device comprising:

a hollow reel hub which structures the winding reel and includes an outer peripheral surface which constitutes a winding surface for the recording tape;

a window portion formed penetrating through a peripheral wall of the reel hub, the leader member being passable through the window portion;

a holding member capable of holding the leader member in the reel hub; and a closing member disposed entirely within the reel hub, the closing member being advanceable and withdrawable with respect to the window portion and, in a state in which the leader member is held by the holding member, the closing member advancing from within the reel hub to the window portion and structuring a portion of the winding surface.

* * * * *